United States Patent
Ahn et al.

(10) Patent No.: US 10,660,136 B2
(45) Date of Patent: *May 19, 2020

(54) WIRELESS COMMUNICATION TERMINAL AND WIRELESS COMMUNICATION METHOD FOR MULTI-USER UPLINK TRANSMISSION

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,321

(22) Filed: Oct. 24, 2019

(65) Prior Publication Data
US 2020/0059973 A1    Feb. 20, 2020

Related U.S. Application Data

(63) Continuation of application No. 15/814,290, filed on Nov. 15, 2017, now Pat. No. 10,512,108, which is a
(Continued)

(30) Foreign Application Priority Data

May 15, 2015  (KR) .................. 10-2015-0068159
Sep. 7, 2015   (KR) .................. 10-2015-0126196
Nov. 6, 2015   (KR) .................. 10-2015-0156149

(51) Int. Cl.
H04W 74/08    (2009.01)
H04W 74/00    (2009.01)
(Continued)

(52) U.S. Cl.
CPC .......... H04W 74/0833 (2013.01); H04L 1/00 (2013.01); H04L 1/18 (2013.01); H04L 5/0055 (2013.01);
(Continued)

(58) Field of Classification Search
CPC ... H04L 1/18; H04L 27/0006; H04L 27/2602; H04L 5/0055; H04L 5/0094;
(Continued)

(56) References Cited

U.S. PATENT DOCUMENTS

2011/0235593 A1    9/2011  Gong et al.
2012/0314697 A1    12/2012 Noh et al.
(Continued)

FOREIGN PATENT DOCUMENTS

CN    103081373    5/2013
JP    2010-130625   6/2010
(Continued)

OTHER PUBLICATIONS

International Preliminary Report on Patentability (Chapter I) for PCT/KR2016/005181 dated Nov. 21, 2017 and its English translation from WIPO (published as WO 2016/186420).
(Continued)

Primary Examiner — Saad A. Waqas
(74) Attorney, Agent, or Firm — Ladas & Parry, LLP

(57) ABSTRACT

The present invention relates to a wireless communication terminal and a wireless communication method for efficiently scheduling multi-user uplink transmission.
To this end, provided are a wireless communication terminal, including: a transceiver; and a processor, wherein the
(Continued)

processor is configured to: receive, by the transceiver, a trigger frame that triggers a multi-user uplink transmission, perform a multi-user uplink transmission in response to the received trigger frame, and receive, by the transceiver, an ACK for the multi-user uplink transmission, wherein when the multi-user uplink transmission is performed on a resource unit in which a temporary association identifier (AID) is assigned by the received trigger frame, the processor obtains ACK information for the terminal from the ACK for the multi-user uplink transmission based on the temporary AID and a wireless communication method using the same.

16 Claims, 21 Drawing Sheets

Related U.S. Application Data continuation of application No. PCT/KR2016/005181, filed on May 16, 2016.

(51) Int. Cl.
  *H04W 72/12* (2009.01)
  *H04W 28/26* (2009.01)
  *H04L 5/00* (2006.01)
  *H04L 1/18* (2006.01)
  *H04L 27/00* (2006.01)
  *H04L 1/00* (2006.01)
  *H04L 27/26* (2006.01)
  *H04W 72/04* (2009.01)

(52) U.S. Cl.
  CPC ........ *H04L 5/0094* (2013.01); *H04L 27/0006* (2013.01); *H04W 28/26* (2013.01); *H04W 72/12* (2013.01); *H04W 72/1268* (2013.01); *H04W 74/004* (2013.01); *H04L 27/2602* (2013.01); *H04W 72/0453* (2013.01)

(58) Field of Classification Search
  CPC . H04W 28/26; H04W 72/0453; H04W 72/12; H04W 72/1268; H04W 74/004; H04W 74/0833
  See application file for complete search history.

(56) References Cited

U.S. PATENT DOCUMENTS

| | | | |
|---|---|---|---|
| 2015/0365940 A1* | 12/2015 | Chu | H04B 7/0452 370/329 |
| 2017/0279864 A1* | 9/2017 | Chun | H04L 65/4076 |
| 2017/0280359 A1* | 9/2017 | Dong | H04L 61/25 |
| 2018/0077723 A1* | 3/2018 | Adachi | H04L 5/0007 |
| 2018/0077735 A1 | 3/2018 | Ahn et al. | |
| 2018/0138959 A1* | 5/2018 | Chun | H04B 7/0626 |

FOREIGN PATENT DOCUMENTS

| | | |
|---|---|---|
| KR | 10-2013-0143115 | 12/2013 |
| KR | 10-2014-0031150 | 3/2014 |
| KR | 10-2014-0097159 | 8/2014 |
| KR | 10-2014-0130120 | 11/2014 |
| KR | 10-1461347 | 11/2014 |
| KR | 10-2015-0052798 | 5/2015 |
| WO | 2016/186420 | 11/2016 |

OTHER PUBLICATIONS

International Search Report for PCT/KR2016/005181 dated Aug. 24, 2016 and its English translation from WIPO (published as WO 2016/186420).

Written Opinion of the International Searching Authority for PCT/KR2016/005181 dated Aug. 24, 2016 and its English translation from WIPO (published as WO 2016/186420).

Notice of Allowance dated Jul. 25, 2019 for U.S. Appl. No. 15/814,290 (now published as US. 2018/00077735).

Non-Final Office Action dated Apr. 3, 2019 for U.S. Appl. No. 15/814,290 (now published as US. 2018/00077735).

Office Action dated Dec. 27, 2019 for Chinese Patent Application No. 201680028955.5 and its English translation provided by Applicant's foreign counsel.

Decision for Grant dated Jan. 13, 2020 for Korean Patent Application No. 10-2017-7033597 and its English translation provided by Applicant's foreign counsel.

Office Action dated Mar. 11, 2020 for Indian Patent Application No. 201717040888.

* cited by examiner

| Pattern | 20 MHz channel | | | | | | | | | AIDs |
|---|---|---|---|---|---|---|---|---|---|---|
| Pattern 1 | 26 | 26 | 26 | 26 | 26 | 26 | 26 | 26 | 26 | 9 AIDs |
| Pattern 2 | 52 | | 26 | 26 | 26 | 26 | 26 | 26 | 26 | 8 AIDs |
| Pattern 3 | 26 | 52 | | 26 | 26 | 26 | 26 | 26 | 26 | 8 AIDs |
| Pattern 4 | 26 | 26 | 52 | | 26 | 26 | 26 | 26 | 26 | 8 AIDs |
| Pattern 5 | 26 | 26 | 26 | 26 | 52 | | 26 | 26 | | 8 AIDs |
| Pattern 6 | 26 | 26 | 26 | 26 | 26 | 52 | | 26 | | 8 AIDs |
| Pattern 7 | 26 | 26 | 26 | 26 | 26 | 26 | 26 | 52 | | 8 AIDs |
| Pattern 8 | 52 | | 52 | | 26 | 26 | 26 | 26 | | 7 AIDs |
| Pattern 9 | 52 | | 26 | 26 | 52 | | 26 | 26 | | 7 AIDs |
| Pattern 10 | 52 | | 26 | 26 | 26 | 52 | | 26 | | 7 AIDs |
| Pattern 11 | 52 | | 26 | 26 | 26 | 26 | 52 | | | 7 AIDs |
| Pattern 12 | 26 | 52 | | 26 | 26 | 52 | | 26 | 26 | 7 AIDs |
| Pattern 13 | 26 | 52 | | 26 | 26 | 26 | 52 | | 26 | 7 AIDs |
| Pattern 14 | 26 | 52 | | 26 | 26 | 26 | 26 | 52 | | 7 AIDs |
| Pattern 15 | 26 | 26 | 52 | | 26 | 52 | | 26 | 26 | 7 AIDs |
| Pattern 16 | 26 | 26 | 52 | | 26 | 26 | 52 | | 26 | 7 AIDs |
| Pattern 17 | 26 | 26 | 52 | | 26 | 26 | 26 | 52 | | 7 AIDs |
| Pattern 18 | 26 | 26 | 26 | 26 | 26 | 52 | | 52 | | 7 AIDs |

| Pattern | 20 MHz channel | | | | | | AIDs |
|---|---|---|---|---|---|---|---|
| Pattern 19 | 52 | 52 | 26 | 52 | 26 | 26 | 6 AIDs |
| Pattern 20 | 52 | 52 | 26 | 26 | 52 | 26 | 6 AIDs |
| Pattern 21 | 52 | 52 | 26 | 26 | 26 | 52 | 6 AIDs |
| Pattern 22 | 26 | 52 | 26 | 26 | 52 | 52 | 6 AIDs |
| Pattern 23 | 26 | 26 | 52 | 26 | 52 | 52 | 6 AIDs |
| Pattern 24 | 52 | 52 | 26 | 52 | 52 | | 5 AIDs |
| Pattern 25 | 106 | | 26 | 26 | 26 | 26 | 26 | 6 AIDs |
| Pattern 26 | 106 | | 26 | 52 | 26 | 26 | 5 AIDs |
| Pattern 27 | 106 | | 26 | 26 | 52 | 26 | 5 AIDs |
| Pattern 28 | 106 | | 26 | 26 | 26 | 52 | 5 AIDs |
| Pattern 29 | 106 | | 26 | 52 | 52 | | 4 AIDs |
| Pattern 30 | 26 | 26 | 26 | 26 | 26 | 106 | | 6 AIDs |
| Pattern 31 | 52 | 26 | 26 | 26 | 106 | | 5 AIDs |
| Pattern 32 | 26 | 52 | 26 | 26 | 106 | | 5 AIDs |
| Pattern 33 | 26 | 26 | 52 | 26 | 106 | | 5 AIDs |
| Pattern 34 | 52 | 52 | 26 | 106 | | 4 AIDs |
| Pattern 35 | 106 | | 26 | 106 | | 3 AIDs |

*FIG. 11*

WIRELESS COMMUNICATION TERMINAL AND WIRELESS COMMUNICATION METHOD FOR MULTI-USER UPLINK TRANSMISSION

CROSS-REFERENCE TO RELATED APPLICATIONS

This application is a continuation of U.S. patent application Ser. No. 15/814,290 filed on Nov. 15, 2017, which is a continuation of International Patent Application No. PCT/KR2016/005181 filed on May 16, 2016, which claims the priority to Korean Patent Application No. 10-2015-0068159 filed in the Korean Intellectual Property Office on May 15, 2015, Korean Patent Application No. 10-2015-0126196 filed in the Korean Intellectual Property Office on Sep. 7, 2015, and Korean Patent Application No. 10-2015-0156149 filed in the Korean Intellectual Property Office on Nov. 6, 2015, the entire contents of which are incorporated herein by reference.

TECHNICAL FIELD

The present invention relates to a wireless communication terminal and a wireless communication method for multi-user uplink transmission, and more particularly, to a wireless communication terminal and a wireless communication method for efficiently scheduling simultaneous uplink transmission of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to provide a method by which a plurality of terminals can efficiently perform multi-user uplink transmission.

In addition, the present invention has an object to provide a structure of a trigger frame for a multi-user uplink transmission in a contention-based channel access system.

Technical Solution

In order to achieve the objects, the present invention provides a wireless communication method and a wireless communication terminal as below.

First, an exemplary embodiment of the present invention provides a wireless communication terminal, including: a transceiver configured to transmit and receive a wireless signal; and a processor configured to control an operation of the wireless communication terminal, wherein the transceiver receives a trigger frame that triggers a multi-user uplink data transmission, transmits multi-user uplink data in response to the received trigger frame and receives a block ACK in response to the multi-user uplink data, and wherein the processor obtains a temporary association identifier (AID) from the received trigger frame and obtains ACK information for the terminal in the block ACK based on the temporary AID.

In this case, the temporary AID may indicate a resource unit containing ACK information for the terminal in the block ACK.

According to an embodiment, the temporary AID may be a group AID corresponding to a plurality of STAs performing the multi-user uplink data transmission.

According to another embodiment, the temporary AID may be selected from unused AIDs in a corresponding basic service set (BSS).

According to a first embodiment, the AID may comprise a first AID set consisting of AIDs used for AID assignment of terminals and a second AID set consisting of AIDs not used for AID assignment of terminals, and the temporary AID may be selected from the second AID set.

According to a second embodiment, the AID may comprise a first AID set consisting of AIDs used for AID assignment of terminals and a second AID set consisting of AIDs not used for AID assignment of terminals, and the temporary AID may be selected from unused AIDs of the first AID set.

Furthermore, the temporary AID may have a value different from the AID assigned to the terminal.

In addition, the trigger frame may set at least one random access resource unit, and the temporary AID may be assigned to the random access resource unit.

According to an embodiment, the block ACK may be a multi-STA block ACK (M-BA), and the temporary AID may be included in a per STA information field of the M-BA.

According to another embodiment, the block ACK may be an OFDMA block ACK, and the temporary AID may be included in HE-SIG-B of the OFDMA block ACK.

In addition, an exemplary embodiment of the present invention provides a wireless communication method of a wireless communication terminal, including: receiving a trigger frame that triggers a multi-user uplink data transmission; obtaining a temporary association identifier (AID) from the received trigger frame; transmitting multi-user uplink data in response to the received trigger frame; receiving a block ACK in response to the multi-user uplink data; and obtaining ACK information for the terminal in the block ACK based on the temporary AID.

Advantageous Effects

According to an embodiment of the present invention, efficient multi-user uplink transmission scheduling is possible in a contention-based channel access system.

According to an embodiment of the present invention, it is possible to efficiently support random access of terminals using a trigger frame.

Also, according to an embodiment of the present invention, it is possible to efficiently set NAVs for terminals not participating in the multi-user uplink/downlink transmission.

According to an embodiment of the present invention, it is possible to increase the total resource utilization rate in the contention-based channel access system and improve the performance of the wireless LAN system.

DESCRIPTION OF DRAWINGS

FIG. 11 illustrates a configuration of a resource unit pattern according to an embodiment of the present invention.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0068159, 10-2015-0126196 and 10-2015-0156149 filed in the Korean Intellectual Property Office and the embodiments and mentioned items described in the respective application, which forms the basis of the priority, shall be included in the Detailed Description of the present application.

Figure 1:
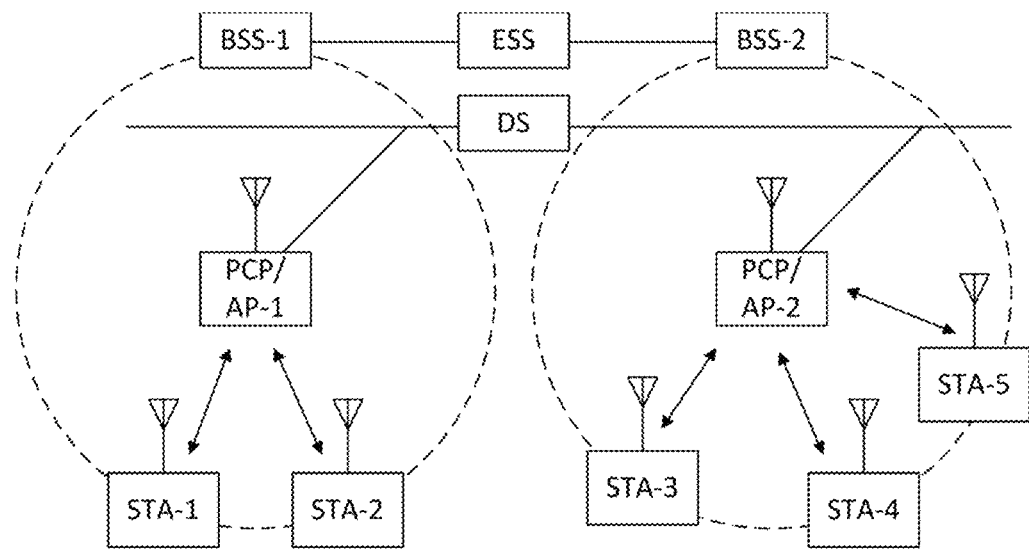
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
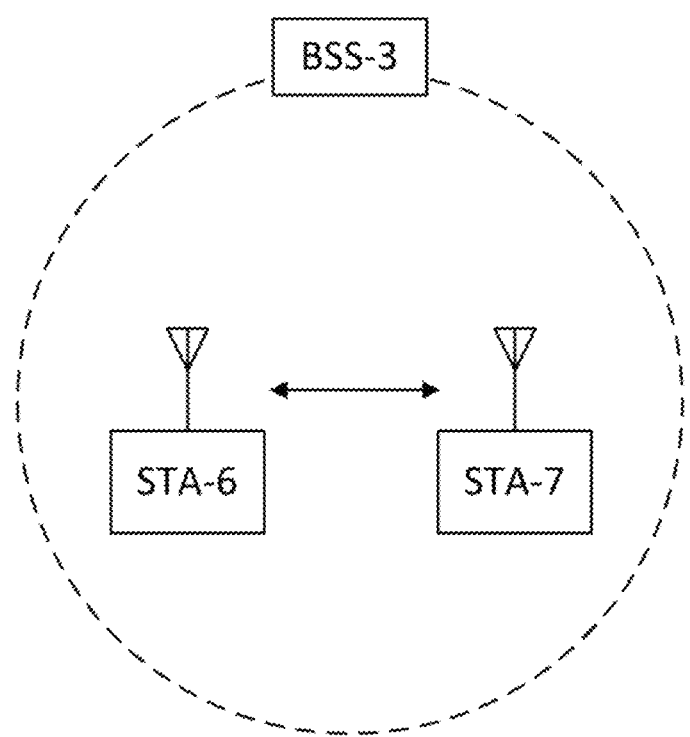
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
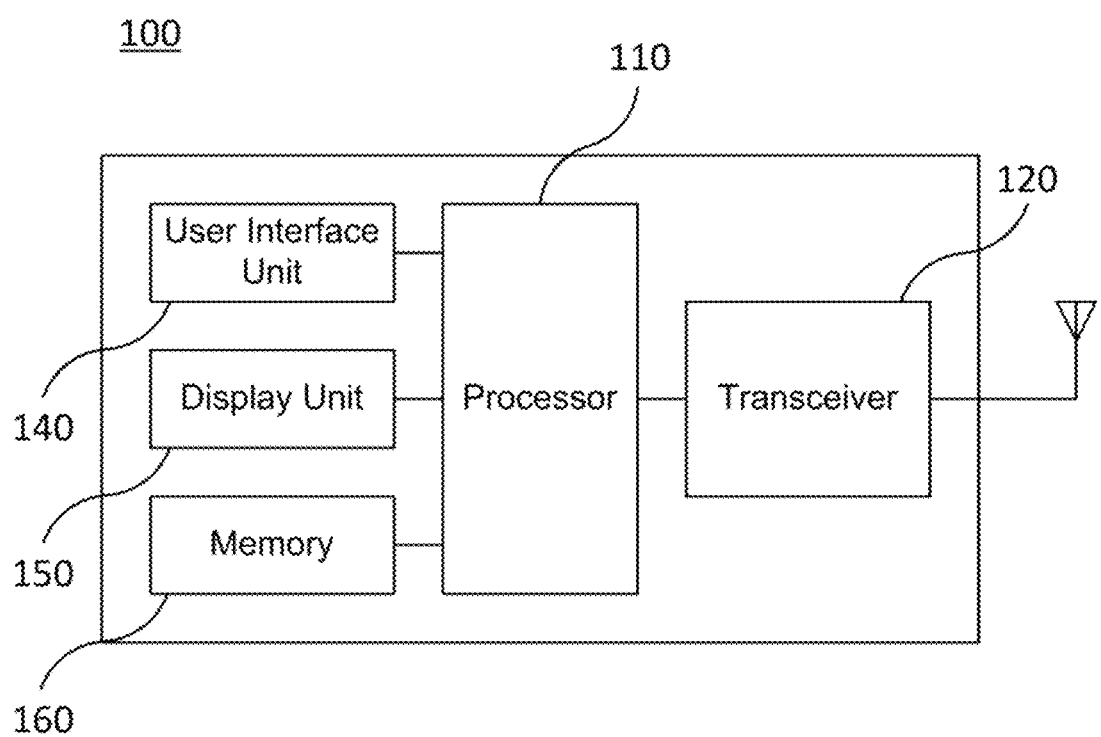
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. That is, the processor 110 may be a modem or a modulator/demodulator for modulating and demodulating wireless signals transmitted to and received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
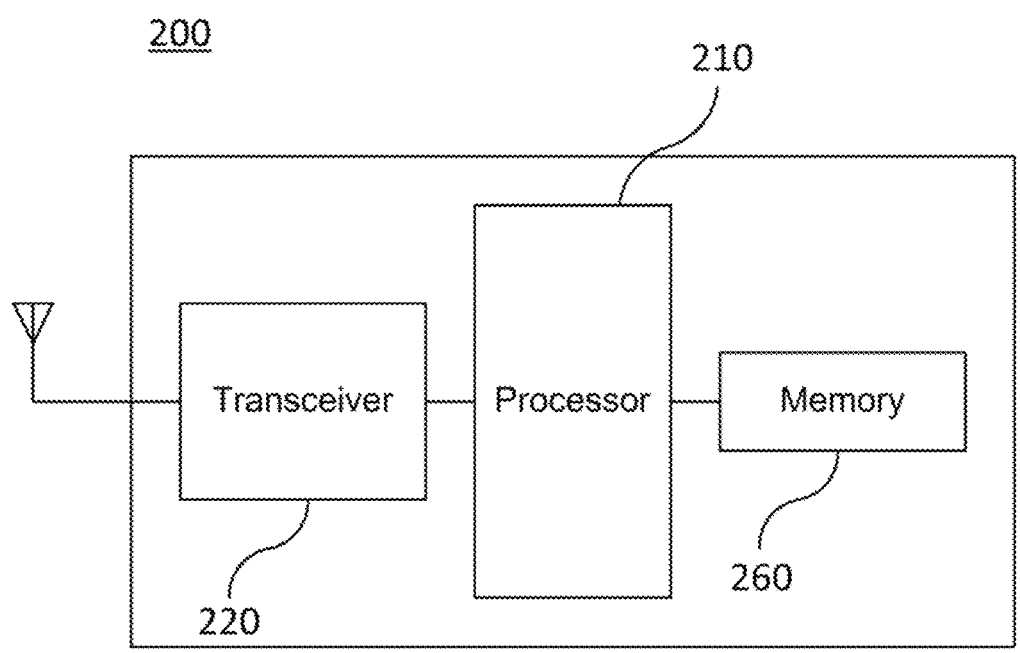
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the transceiver 220. The processor 210 controls various operations such as wireless signal transmission/reception of the AP 200 according to the embodiment of the present invention. A detailed embodiment thereof will be described below.

Figure 5:
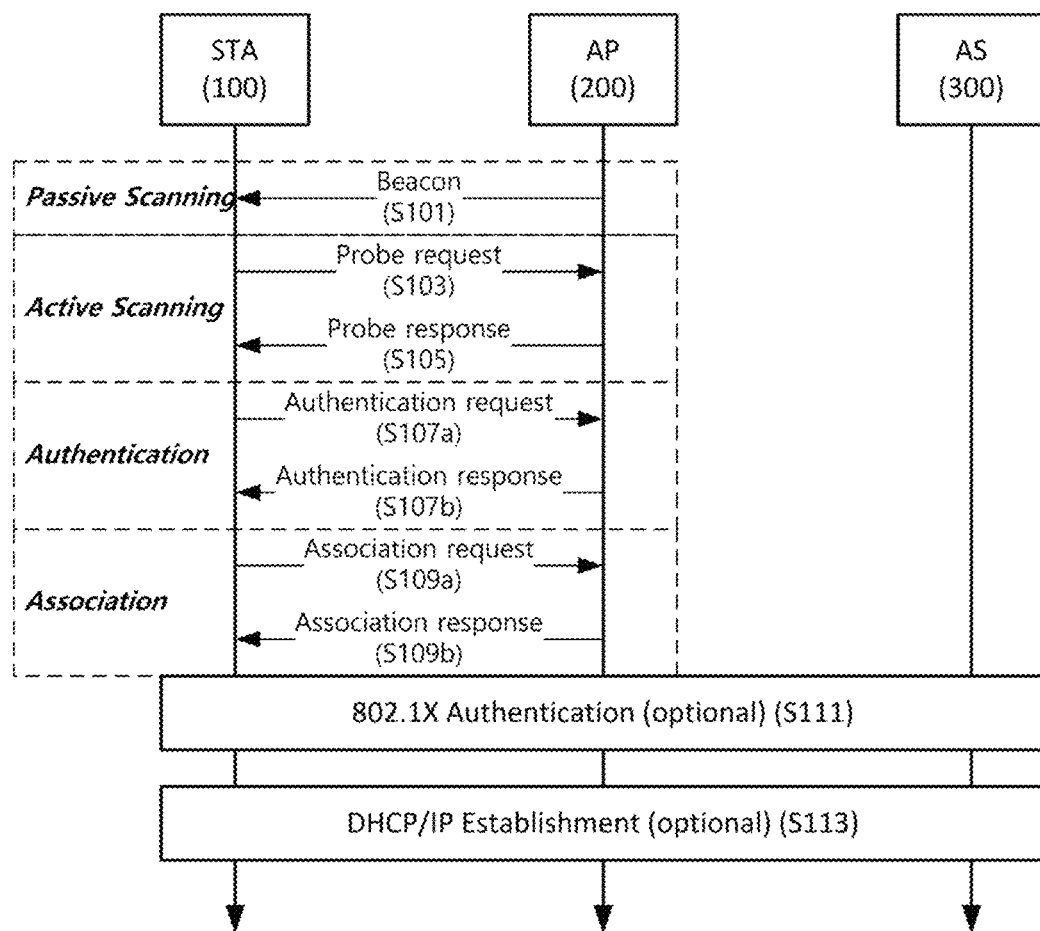
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
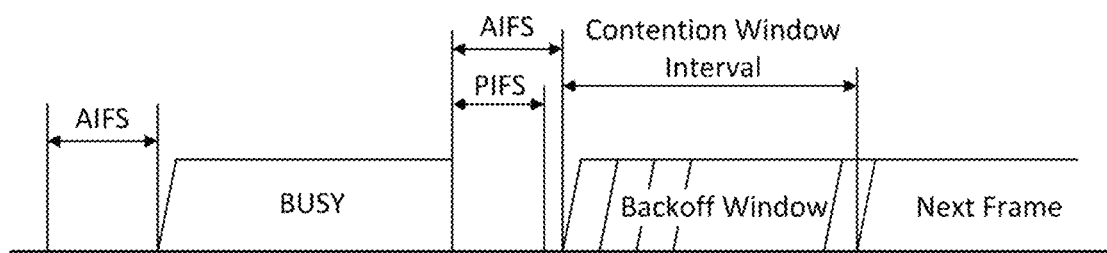
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
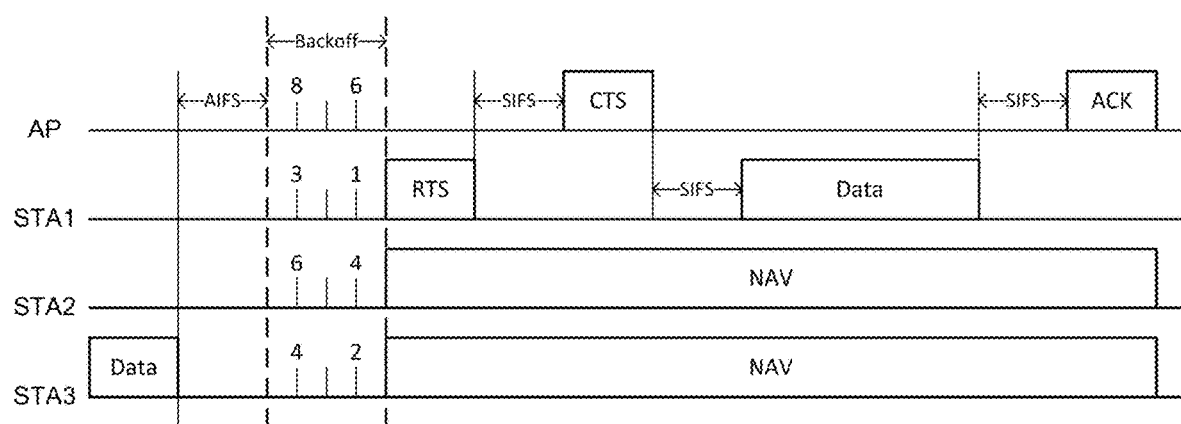
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

Multi-User Uplink Transmission

When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a multi-user downlink transmission in which an AP simultaneously transmits data to a plurality of STAs, and a multi-user uplink transmission in which a plurality of STAs simultaneously transmit data to the AP may be performed.

In order to perform the multi-user uplink transmission, the channel to be used and the transmission start time of each STA that performs uplink transmission should be adjusted. In order to efficiently schedule the multi-user uplink transmission, state information of each STA needs to be transmitted to the AP. According to an embodiment of the present invention, information for scheduling of a multi-user uplink transmission may be indicated through a predetermined field of a preamble of a packet and/or a predetermined field of a MAC header. For example, a STA may indicate information for multi-user uplink transmission scheduling through a predetermined field of a preamble or a MAC header of an uplink transmission packet, and may transmit the information to an AP. In this case, the information for multi-user uplink transmission scheduling includes at least one of buffer status information of each STA, channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the multi-user uplink transmission process may be managed by the AP. The multi-user uplink transmission may be performed in response to a trigger frame transmitted by the AP. The STAs simultaneously transmit uplink data a predetermined IFS time after receiving the trigger frame. The trigger frame indicates the data transmission time point of the uplink STAs and may inform the channel (or subchannel)

information allocated to the uplink STAs. When the AP transmits the trigger frame, a plurality of STAs transmit uplink data through the respective allocated subcarriers at a time point designated by the trigger frame. After the uplink data transmission is completed, the AP transmits an ACK to the STAs that have successfully transmitted the uplink data. In this case, the AP may transmit a predetermined multi-STA block ACK (M-BA) as an ACK for a plurality of STAs.

In the non-legacy wireless LAN system, a specific number, for example, 26, 52, or 106 tones may be used as a resource unit (RU) for a subchannel-based access in a channel of 20 MHz band. Accordingly, the trigger frame may indicate identification information of each STA participating in the multi-user uplink transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, multi-user uplink transmission may be performed based on a contention of a plurality of STAs for a particular resource unit. For example, if an AID field value for a particular resource unit is set to a specific value (e.g., 0) that is not assigned to STAs, a plurality of STAs may attempt random access (RA) for the corresponding resource unit. Therefore, there is a need for a method of allocating resources for a random access based multi-user uplink transmission of such a plurality of STAs.

Figure 8:
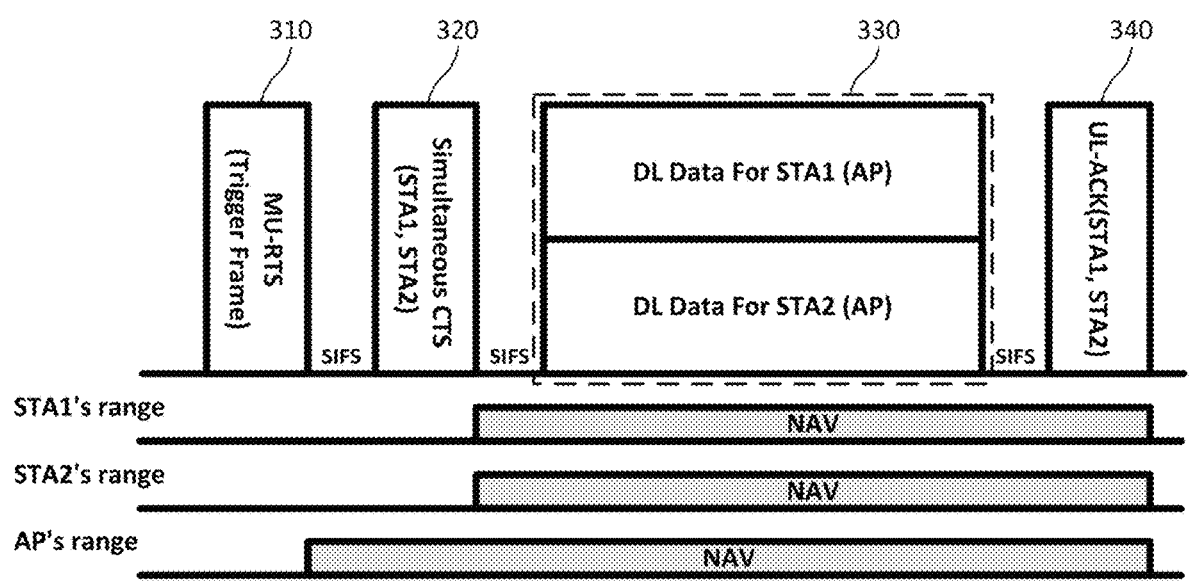
FIGS. 8 and 9 illustrate a hidden node protection method in a multi-user transmission process.
Figure 9:
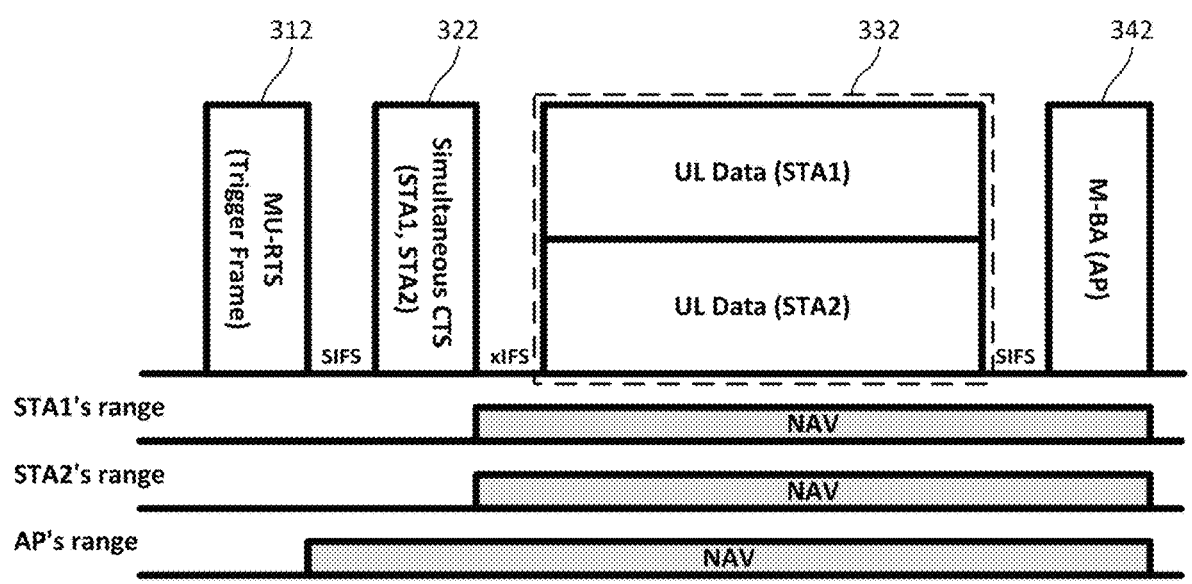

FIGS. 8 and 9 illustrate a hidden node protection method in a multi-user transmission process. In the multi-user uplink/downlink transmission process, NAV setting of terminals not participating in data transmission is required. In particular, when multi-user transmission is performed on a subchannel basis, there is a need for a method that enables legacy terminals that cannot receive subchannel data to correctly set the NAV.

FIG. 8 illustrates a hidden node protection method in a downlink OFDMA (DL-OFDMA) transmission. According to the embodiment of the present invention, an RTS and/or CTS frame of a predetermined format is used for NAV setting in the DL-OFDMA transmission process. First, the AP transmits a multi-user RTS (MU-RTS) frame 310 for NAV setting in the DL-OFDMA transmission process. The duration field of the MU-RTS frame 310 is set to a value until the end of the DL-OFDMA session. That is, the duration field of the MU-RTS frame 310 is set based on a period until the downlink data transmission of the AP and the ACK frame transmission of STAs are completed. Neighboring terminals of the AP set a NAV until the end of the DL-OFDMA session based on the duration field of the MU-RTS frame 310 transmitted by the AP. According to an embodiment, the MU-RTS frame 310 may be configured in the format of a trigger frame and requests transmissions of simultaneous CTS frames 320 of the STAs.

The STAs (i.e., STA1 and STA2) receiving the MU-RTS frame 310 from the AP transmit a simultaneous CTS frame 320. The simultaneous CTS frame 320 transmitted by a plurality of STAs has the same waveform. That is, the simultaneous CTS frame 320 transmitted by the STA1 through the first channel has the same waveform as the simultaneous CTS frame 320 transmitted by the STA2 through the first channel. According to an embodiment, the simultaneous CTS frame 320 is transmitted on the channel indicated by the MU-RTS frame 310. The duration field of the simultaneous CTS frame 320 is set up to the point at which the DL-OFDMA session is terminated based on the information of the duration field of the MU-RTS frame 310. That is, the duration field of the simultaneous CTS frame 320 is set based on a period until the downlink data transmission of the AP and the ACK frame transmission of STAs are completed. In FIG. 8, the neighboring terminals of STA1 and STA2 set the NAV until the end of the DL-OFDMA session based on the duration field of the simultaneous CTS frame 320.

According to an embodiment of the present invention, the MU-RTS frame 310 and the simultaneous CTS frame 320 may be transmitted on a 20 MHz channel basis. Accordingly, neighboring terminals including the legacy terminals can receive the MU-RTS frame 310 and/or the simultaneous CTS frame 320 and set the NAV.

When the transmissions of the MU-RTS frame 310 and the simultaneous CTS frame 320 are completed, the AP transmits DL data frame 330. In FIG. 8, an embodiment that the AP transmits DL-OFDMA data to STA1 and STA2, respectively, is illustrated. The STAs receive the DL data frame 330 transmitted by the AP and transmit an uplink ACK 340 in response thereto.

FIG. 9 illustrates a hidden node protection method in an uplink OFDMA (UL-OFDMA) transmission. In the embodiment of FIG. 9, duplicative description of parts which are the same as or corresponding to the embodiment of FIG. 8 will be omitted.

According to the embodiment of the present invention, a protection method similar to that of the DL-OFDMA transmission process may be used in the UL-OFDMA transmission process. As described above, the UL-OFDMA transmission process is started by a trigger frame. According to the embodiment of the present invention, the AP transmits an MU-RTS frame 312 configured in the format of a trigger frame for NAV setting in the UL-OFDMA transmission process. The AP may indicate that the corresponding frame is the MU-RTS frame 312 through a predetermined field of the trigger frame. The predetermined field is a field indicating a type of the trigger frame.

The duration field of the MU-RTS frame 312 transmitted by the AP is set to a value until the end of the UL-OFDMA session. That is, the duration field of the MU-RTS frame 312 is set based on the period until the uplink data transmission of the STAs and the ACK frame transmission of the AP are completed. The neighboring terminals of the AP set a NAV until the end of the UL-OFDMA session based on the duration field of the MU-RTS frame 312 transmitted by the AP. As described above, according to the embodiment of the present invention, the AP can increase an efficiency of the UL-OFDMA transmission process by transmitting the MU-RTS frame 312 in which the functions of the trigger frame are integrated.

The STAs (i.e., STA1, STA2) receiving the MU-RTS frame 312 from the AP transmit a simultaneous CTS frame 322. As described above, the simultaneous CTS frame 322 transmitted by a plurality of STAs has the same waveform. The duration field of the simultaneous CTS frame 322 is set up to the point at which the UL-OFDMA session is terminated based on the information of the duration field of the MU-RTS frame 312. That is, the duration field of the simultaneous CTS frame 322 is set based on a period until the uplink data transmission of the STAs and the ACK frame transmission of the AP are completed. The neighboring terminals of STA1 and STA2 set a NAV until the end of the UL-OFDMA session based on the duration field of the simultaneous CTS frame 322.

Resource units are allocated to the STAs through the MU-RTS frame 312 transmitted by the AP, and the STAs transmit UL data frames 332 through the allocated resource units. In FIG. 9, an embodiment that STA1 and STA2 transmit UL-OFDMA data to the AP, respectively, is illustrated. The AP receives UL data frames 332 transmitted by the STAs and transmits a multi-STA block ACK (M-BA, 342) in response thereto.

Meanwhile, the STAs being allocated the resource unit in the UL-OFDMA transmission process transmit a simultaneous CTS frame 322 after SIFS from the reception of the MU-RTS frame 312, and transmit UL data frame 332 after xIFS from the transmission of the simultaneous CTS frame 322. According to an exemplary embodiment, since the STAs that have transmitted the simultaneous CTS frame 322 can transmit UL data without switching transmission/reception, the xIFS can be set to a time shorter than the SIFS.

Figure 10:
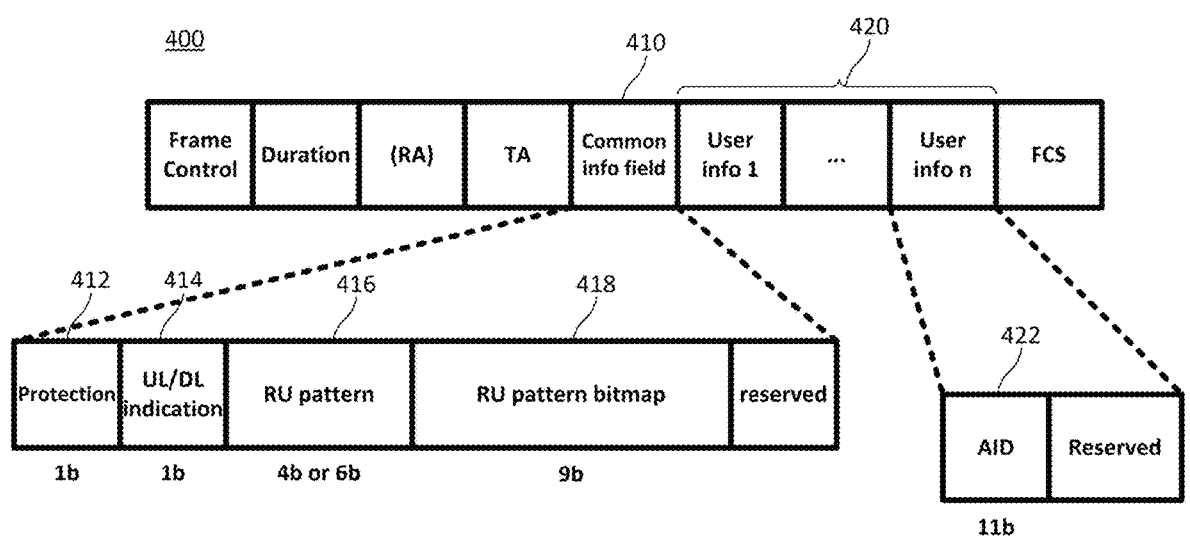
FIG. 10 illustrates a structure of a trigger frame according to an embodiment of the present invention.

FIG. 10 illustrates a structure of a trigger frame according to an embodiment of the present invention. The frame control field and the duration field are set according to a method defined in a conventional wireless LAN frame. The transmitter address (TA) field indicates the MAC address of the terminal (i.e., the AP) transmitting the trigger frame 400. On the other hand, since the trigger frame 400 is transmitted to a plurality of receiving terminals, the receiver address (RA) field may be omitted or may indicate a predefined MAC address.

The trigger frame 400 includes a common information field 410 and a user information field 420. The common information field 410 indicates information that is commonly applied to a plurality of STAs receiving the trigger frame 400. More specifically, the common information field 410 may include at least one of a protection field 412, an UL/DL indication field 414, a resource unit pattern field 416, and a resource unit pattern bitmap field 418.

According to an embodiment, the protection field 412 indicates whether the corresponding trigger frame 400 is an MU-RTS frame. When the protection field 412 is set to 1, the corresponding trigger frame 400 is an MU-RTS frame, and terminals receiving the trigger frame 400 set a NAV based on the duration field of the corresponding trigger frame 400. When the protection field 412 is set to 0, the trigger frame 400 is a basic trigger frame, and the trigger frame 400 is not used for NAV setting of neighboring terminals.

In accordance with a further embodiment of the present invention, the trigger frame 400 may have two or more types and the protection field 412 may represent the type information of the trigger frame 400. In this case, one of the types of the trigger frame 400 may be an MU-RTS.

The UL/DL indication field 414 indicates whether the corresponding trigger frame 400 triggers a multi-user uplink data transmission or a multi-user downlink data transmission. Transmission and reception operations of the terminals after the transmission of the trigger frame 400 and the transmission of the simultaneous CTS frame may be performed based on the UL/DL indication field 414. Although the UL/DL indication field 414 is illustrated in FIG. 10 as being included in the MAC header of the trigger frame 400, the present invention is not limited thereto. According to another embodiment of the present invention, the UL/DL indication field may be included in the PHY preamble of the transmitted packet, for example, HE-SIG-A. In this case, the UL/DL indication field may indicate whether the corresponding packet is an uplink packet or a downlink packet.

Next, the resource unit pattern field 416 and the resource unit pattern bitmap field 418 represent advance information for the user information field 420 having a variable size. According to the embodiment of the present invention, a plurality of resource unit patterns for assigning resource units to respective STAs can be predefined as described in FIGS. 11 and 12. Trigger frame 400 may deliver resource unit allocation information to STAs by designating a pattern number for a predefined resource unit pattern.

The resource unit pattern is composed of a combination of at least one resource unit, and each resource unit has a size of 26-tone, 52-tone or 106-tone. According to an embodiment, each resource unit pattern may be composed of at least three to at most nine resource units. If a pattern number is designated in the resource unit pattern field 416, the trigger frame 400 may include user information fields 420 corresponding to the number of resource units included in the pattern. In this case, the AID field 422 for each user inserted in the user information field 420 is sequentially corresponded to each resource unit of the corresponding resource unit pattern.

The resource unit pattern bitmap field 418 indicates information on an effective resource unit in which the trigger frame 400 performs allocation among the resource units of the resource unit pattern. According to an embodiment, the AP may allocate only a certain number of resource units among the plurality of resource units in the 20 MHz channel to the STAs. When the resource unit pattern includes a maximum of nine resource units, the resource unit pattern bitmap field 418 may be set to a size of nine bits.

The resource unit pattern bitmap field 418 may indicate whether or not each resource unit is allocated to STAs in the order of the resource units constituting the resource unit pattern. For example, when a resource unit pattern including nine resource units is used and only a second one of the resource units is allocated to a STA, the resource unit pattern bitmap field 418 may be set to 010000000. In this case, the trigger frame 400 may include a user information field 420 corresponding to the number of resource units allocated to the STA. That is, since one bit is activated in the resource unit pattern bitmap field 418, the trigger frame 400 includes one user information field 420. As another example, when a resource unit pattern including five resource units is used and a third and a fifth resource unit are allocated to STAs, the resource unit pattern bitmap field 418 may be set to 001010000. In this case, only the first five bits of the resource unit pattern bitmap field 418 may be regarded as valid information. Since two bits are activated in the resource unit pattern bitmap field 418, the trigger frame 400 includes two user information fields 420.

Next, the user information field 420 indicates information applied to an individual STA that receives the trigger frame 400. As described above, the trigger frame 400 may include the user information field 420 as many as the number of resource units included in the specified resource unit pattern, or may include the user information field 420 as many as the number of resource units allocated to STAs. The user information field 420 includes an AID field 422 corresponding to each resource unit. The AID field 422 may indicate an AID of a STA to which the corresponding resource unit is assigned. According to another embodiment, the AID field 422 may represent a group AID or a temporary AID according to various embodiments described below.

FIG. 10 illustrates a structure of a trigger frame 400 according to an embodiment of the present invention. Some fields of the trigger frame 400 illustrated in FIG. 10 may be omitted according to an embodiment. In addition, a specific field not illustrated in FIG. 10 may be further included in the trigger frame 400. The AP generates a trigger frame 400 or an MU-RTS frame in this format, and transmits the frame to start a multi-user uplink transmission process or a multi-user downlink transmission process.

FIG. 11 illustrates a configuration of a resource unit pattern according to an embodiment of the present invention. The resource unit pattern constituting a 20 MHz channel is constituted by a combination of at least one resource unit, and each resource unit has a size of 26-tone, 52-tone or 106-tone. According to an embodiment of the present invention, the central resource unit of the 20 MHz channel is fixed to a size of 26-tone. Both side resource units in reference to the central resource unit may be configured as a combination of at least one of 26-tone, 52-tone and 106-tone. In this case, 35 resource unit patterns as illustrated in FIG. 11 may be defined.

Pattern 1 consists of nine 26-tone resource units. In this case, a maximum of nine AIDs can be assigned to each resource unit. Patterns 2 to 7 consist of one 52-tone resource unit and seven 26-tone resource units. In this case, a maximum of 8 AIDs can be assigned to each resource unit. Patterns 8 to 18 consist of two 52-tone resource units and five 26-tone resource units. In this case, a maximum of 7 AIDs can be assigned to each resource unit. Patterns 19 to 23 consist of three 52-tone resource units and three 26-tone resource units. In this case, a maximum of six AIDs can be assigned to each resource unit. The pattern 24 consists of four 52-tone resource units and one 26-tone resource unit. In this case, a maximum of 5 AIDs can be assigned to each resource unit.

Pattern 25 and pattern 30 consist of one 106-tone resource unit and five 26-tone resource units. In this case, a maximum of six AIDs can be assigned to each resource unit. The patterns 26 to 28 and the patterns 31 to 33 consist of one 106-tone resource unit, one 52-tone resource unit, and three 26-tone resource units. In this case, a maximum of 5 AIDs can be assigned to each resource unit. Pattern 29 and pattern 34 consist of one 106-tone resource unit, two 52-tone resource units, and one 26-tone resource unit. In this case, a maximum of four AIDs can be assigned to each resource unit. The pattern 35 consists of two 106-tone resource units and one 26-tone resource unit. In this case, a maximum of three AIDs can be assigned to each resource unit.

Figure 12:
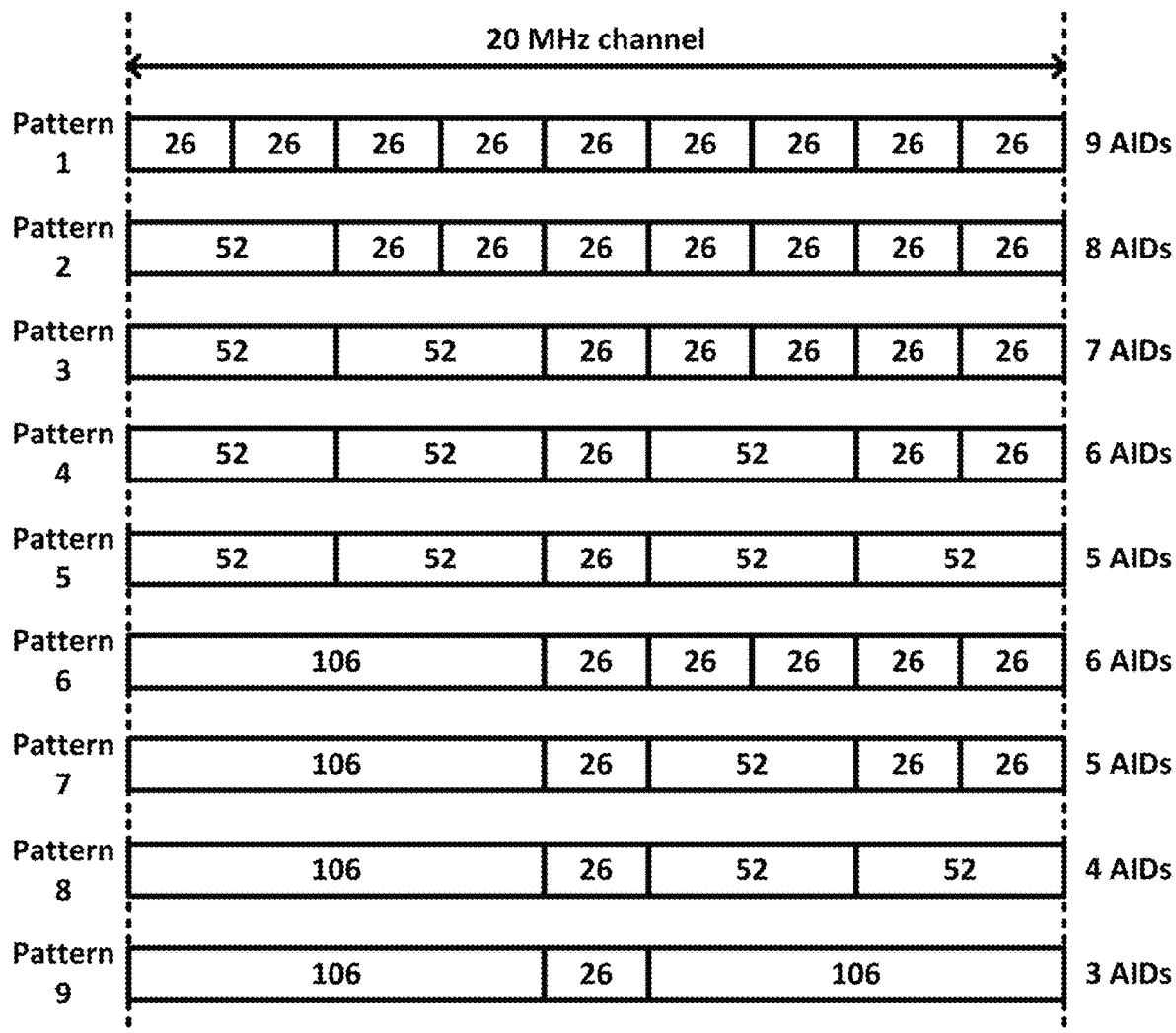
FIG. 12 illustrates a configuration of a resource unit pattern according to another embodiment of the present invention.

FIG. 12 illustrates a configuration of a resource unit pattern according to another embodiment of the present invention. In the embodiment of FIG. 12, duplicative description of parts which are the same as or corresponding to the embodiment of FIG. 11 will be omitted.

When assigning STAs to each resource unit of a 20 MHz channel, resource unit patterns can be simplified if frequency selectivity is not considered. According to the embodiment of FIG. 12, each resource unit of the resource unit pattern may be arranged in the order of size. As described above, the central resource unit of the 20 MHz channel is fixed to a size of 26-tone. Both side resource units in reference to the central resource unit may be configured as a combination of at least one of 26-tone, 52-tone and 106-tone, and the both side resource units are arranged in the order of size. In this case, as illustrated in FIG. 12, a total of nine resource unit patterns can be defined.

Pattern 1 consists of nine 26-tone resource units. In this case, a maximum of nine AIDs can be assigned to each resource unit. Pattern 2 consists of one 52-tone resource unit and seven 26-tone resource units. In this case, a maximum of 8 AIDs can be assigned to each resource unit. Pattern 3 consists of two 52-tone resource units and five 26-tone resource units. In this case, a maximum of 7 AIDs can be assigned to each resource unit. Pattern 4 consists of three 52-tone resource units and three 26-tone resource units. In this case, a maximum of six AIDs can be assigned to each resource unit. Pattern 5 consists of four 52-tone resource units and one 26-tone resource unit. In this case, a maximum of 5 AIDs can be assigned to each resource unit.

Pattern 6 consists of one 106-tone resource unit and five 26-tone resource units. In this case, a maximum of 7 AIDs can be assigned to each resource unit. Pattern 7 consists of one 106-tone resource unit, one 52-tone resource unit, and three 26-tone resource units. In this case, a maximum of 5 AIDs can be assigned to each resource unit. Pattern 8 consists of one 106-tone resource unit, two 52-tone resource units, and one 26-tone resource unit. In this case, a maximum of four AIDs can be assigned to each resource unit. Pattern 9 consists of two 106-tone resource units and one 26-tone resource unit. In this case, a maximum of three AIDs can be assigned to each resource unit.

As described above, according to the embodiment of FIGS. 11 and 12, the resource unit pattern includes at least one 26-tone resource unit and can be composed of at least three to at most nine resource units. According to the embodiment of FIG. 11, the resource unit pattern field may have a size of 6 bits. On the other hand, according to the embodiment of FIG. 12, the resource unit pattern field can be simplified to a size of 4 bits. According to another embodiment of the present invention, a 106-tone resource unit may be replaced with a 102-tone resource unit or a 104-tone resource unit according to the arrangement of pilot subcarriers and data subcarriers.

Figure 13:
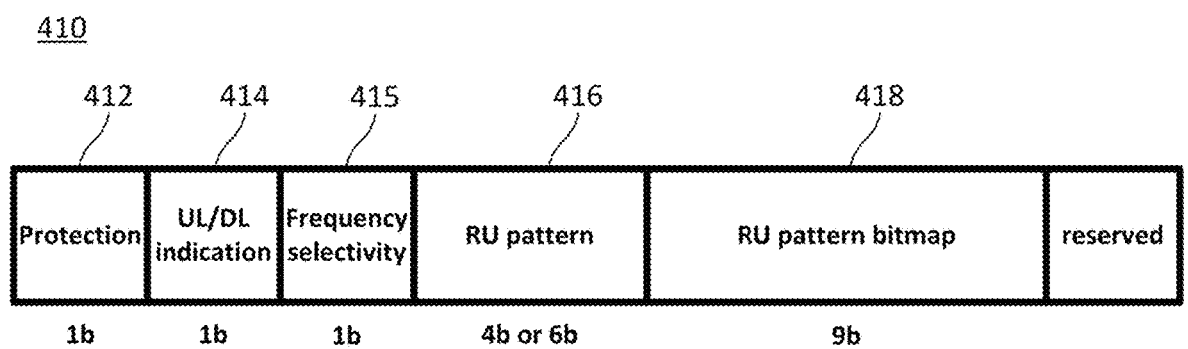
FIG. 13 illustrates a structure of a common information field of a trigger frame according to another embodiment of the present invention.

FIG. 13 illustrates a structure of a common information field of a trigger frame according to another embodiment of the present invention. In the embodiment of FIG. 13, duplicative description of parts which are the same as or corresponding to the embodiment of FIG. 10 will be omitted.

According to another embodiment of the present invention, the common information field 410 of the trigger frame may further include a frequency selectivity field 415. In constructing the resource unit pattern, the frequency selectivity may be selectively reflected according to the network environment. If the frequency selectivity is reflected as in the embodiment of FIG. 11, the length of the resource unit pattern field 416 may be set to 6 bits. In addition, if the frequency selectivity is not reflected as in the embodiment of FIG. 12, the length of the resource unit pattern field 416 may be set to 4 bits. The frequency selectivity field 415 indicates information on which length among the lengths of the variable resource unit pattern field 416 is used. That is, the frequency selectivity field 415 indicates which pattern set is to be used among the predetermined resource unit pattern sets.

Figure 14:
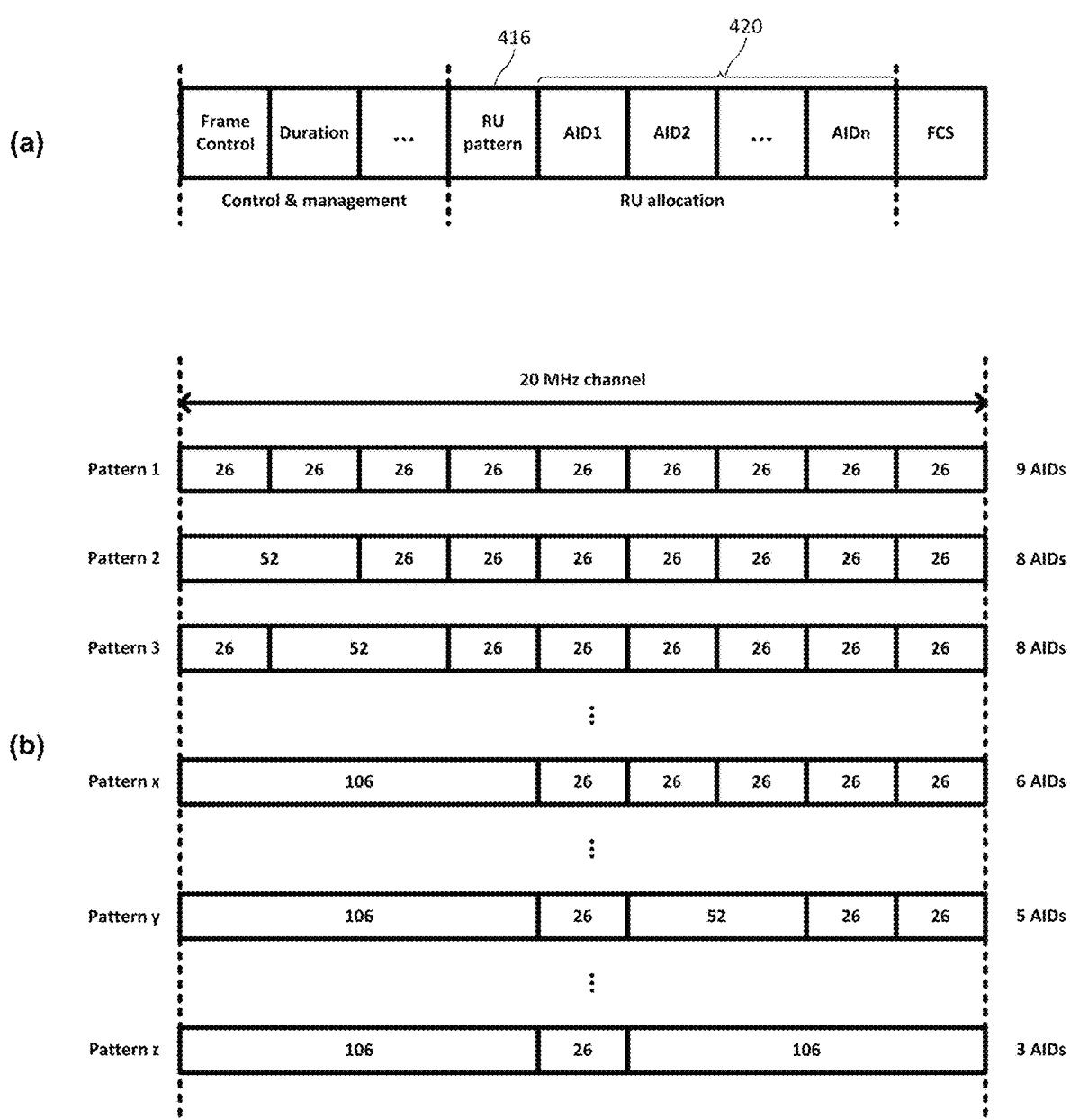
FIG. 14 illustrates a structure of a trigger frame and a resource unit pattern according to an embodiment of the present invention.
Figure 15:
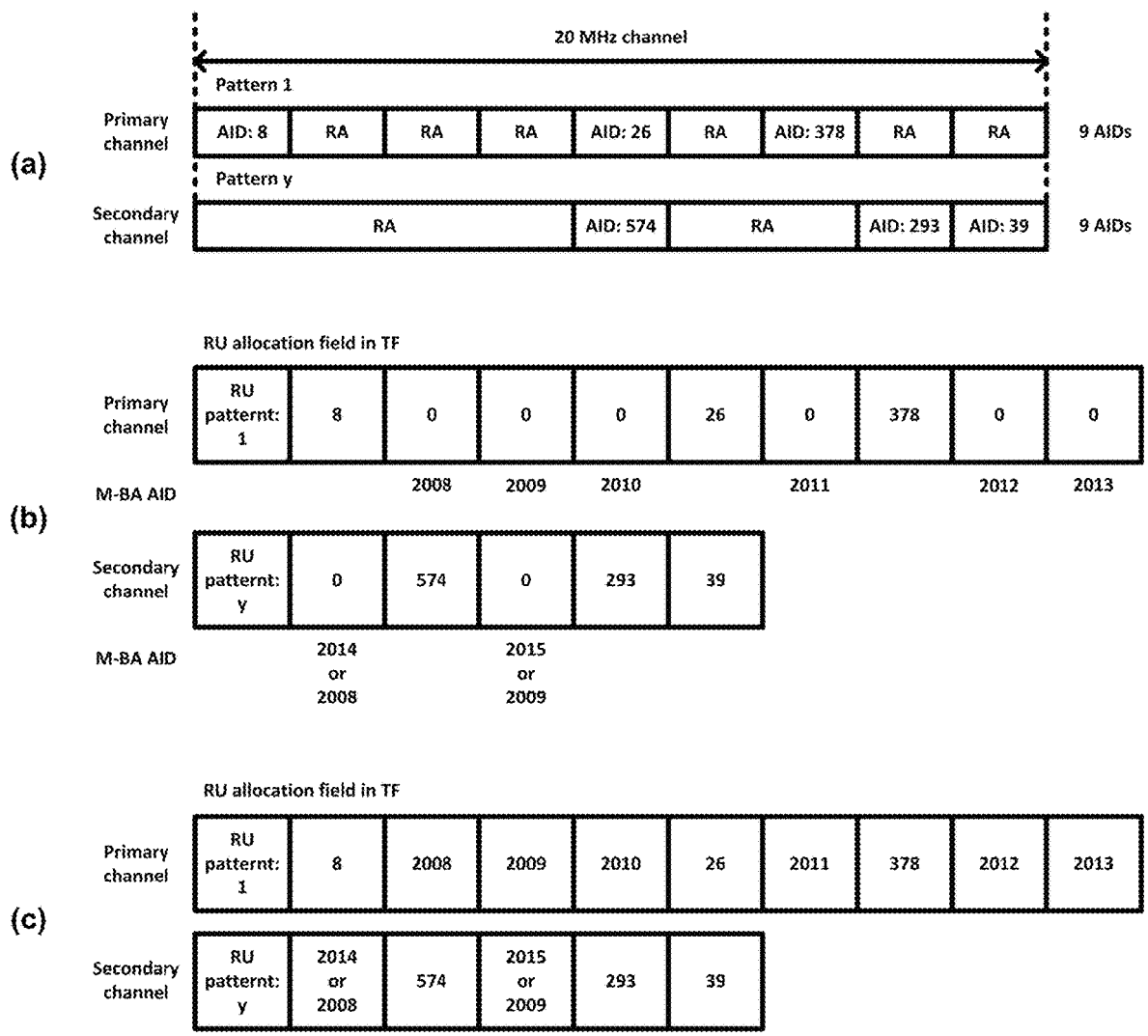
FIG. 15 illustrates a resource allocation method for a random access based multi-user uplink transmission according to an embodiment of the present invention.
Figure 16:
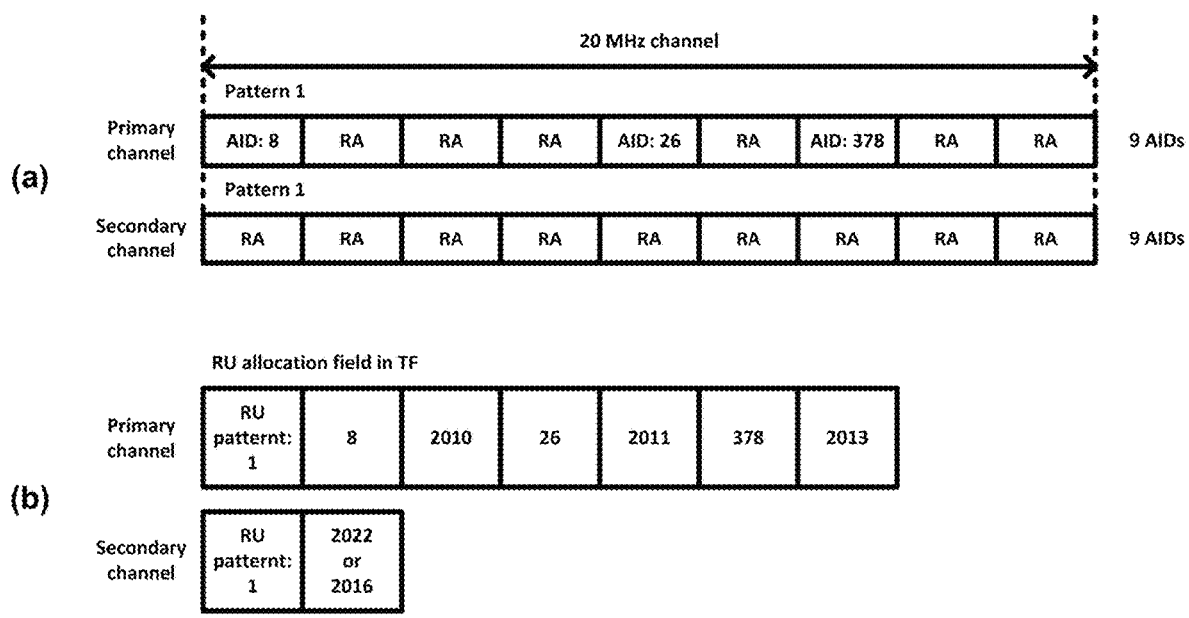
FIG. 16 illustrates a resource allocation method for a random access based multi-user uplink transmission according to another embodiment of the present invention.

FIGS. 14 to 16 illustrate a temporary AID assignment method for a multi-user uplink transmission. According to an embodiment of the present invention, a temporary AID may be used for a particular resource unit in the multi-user uplink transmission.

In a non-legacy wireless LAN system, a multi-user uplink transmission may be performed based on competition of a plurality of STAs for a particular resource unit. For example, if an AID field value for a particular resource unit is set to a particular value (e.g., 0) that is not assigned to the STA, a plurality of STAs may attempt random access (RA) for the corresponding resource unit. Therefore, a method of allocating resources for such a random access based multi-user uplink transmission of a plurality of STAs is needed.

According to an embodiment, a probe request and/or an association request may be transmitted through a random access based multi-user uplink transmission. That is, STAs that are not assigned an AID can transmit a probe request or association request to the AP through a resource unit for random access in a multi-user uplink transmission process.

After the multi-user uplink transmission is completed, the AP transmits ACK information for the requests of the STAs through a block ACK. However, since STAs that have transmitted the requests to the AP have not been assigned an AID, a method for the STAs to identify ACK information for themselves in the block ACK is needed.

FIG. 14 illustrates a structure of a trigger frame and a resource unit pattern according to an embodiment of the present invention. FIG. 14 illustrates an example of a temporary AID assignment method described later. FIG. 14 (a) illustrates a structure of a trigger frame, and FIG. 14 (b) illustrates a resource unit pattern. In the embodiment of FIG. 14, the same or corresponding parts as those of the embodiment of FIGS. 10 to 13 are not described.

As described above, a plurality of resource unit patterns for assigning resource units to respective STAs can be predefined. The trigger frame may deliver resource unit allocation information to STAs by designating a pattern number for a predefined resource unit pattern. In the OFDMA of the non-legacy wireless LAN system, resources are allocated in a combination of at least one of 26-tone, 52-tone and 106-tone resource units and pilots within a 242-tone available in a 20 MHz channel. Since the combination of resource units having fixed sizes is used, the number of resource unit patterns may be finite, and pattern numbers for all combination patterns can be assigned and designated. The trigger frame may designate a pattern number for identifying the corresponding one of the predefined resource unit patterns through the resource unit pattern field 416. In addition, the user information field 420 may designate AIDs sequentially corresponding to each resource unit of the resource unit pattern through the AID field for each user.

For example, if the pattern number of the resource unit pattern consist of resource units of 106-tone, 26-tone, 52-tone, 26-tone and 26-tone is y and the resource units may be allocated as a sequence of (106-tone: STA1, 26-tone: STA2, 52-tone: STA3, 26-tone: STA4, 26-tone: STA5). In this case, the value of the resource unit pattern field 416 of the trigger frame is set to 'y'. In addition, AID fields for each user in the user information field 420 of the trigger frame are sequentially inserted with AIDs corresponding to STA1, STA2, STA3, STA4 and STA5. If the central resource unit of the 20 MHz channel is fixed to a size of 26-tone, the size of the resource unit pattern field 416 may be set to 1 byte. According to another embodiment, when the condition for pattern allocation is mitigated, the size of the resource unit pattern field 416 may be designated as 2 to 3 bytes. In addition, since the number of STAs allocated according to the resource unit pattern may vary, the structure of the user information field 420 may be variable.

FIG. 15 illustrates a resource allocation method for a random access based multi-user uplink transmission according to an embodiment of the present invention. In the embodiment of FIG. 15, it is assumed that the pattern 1 of FIG. 14 is allocated as the resource unit pattern of the primary channel and the pattern y of FIG. 14 is allocated as the resource unit pattern of the secondary channel.

First, referring to FIG. 15 (a), the pattern 1 composed of nine 26-tone resource units is used in the primary channel. In this case, the first resource unit, the fifth resource unit, and the seventh resource unit are allocated to STAs of AIDs 8, 26, and 278, respectively. The remaining resource units, i.e., the second to fourth resource units, the sixth resource unit, and the eighth to ninth resource units are set as random access resource units. In the secondary channel, a pattern y composed of one 106-tone resource unit, one 52-tone resource unit and three 26-tone resource units is used. In this case, the second resource unit, the fourth resource unit, and the fifth resource unit are allocated to STAs of AIDs 574, 293, and 39, respectively. The remaining resource units, i.e., the first resource unit and the third resource unit are set as random access resource units.

FIG. 15 (b) illustrates an embodiment of a method of representing a user information field of a trigger frame for the channel of FIG. 15 (a). According to an embodiment of the present invention, the AID field value of the trigger frame indicating a random access resource unit may be set to 0. That is, when the AID field value of the trigger frame for a particular resource unit is 0, STAs can attempt random access to the corresponding resource unit. The STAs that have succeeded in random access can receive ACK information through a block ACK transmitted by the AP. However, when there are a plurality of resource units allocated for random access, each STA needs a method for identifying ACK information for the corresponding STA in the block ACK.

According to an embodiment of the present invention, a temporary AID may be used to identify ACK information for each STA in the block ACK. In an embodiment of the present invention, the temporary AID is selected from unused AIDs in the corresponding BSS. Thus, the temporary AID has a different value from the AIDs assigned to each STA in the BSS. In the wireless LAN system, a value selected from the range of 0 to 2007 can be used as an AID of the terminal, and the value after 2008 is not assigned to an AID of the terminal. That is, the first AID set consists of AIDs used for the AID assignment of the terminals, and the second AID set consists of AIDs not used for the AID assignment of the terminals. According to an embodiment of the present invention, a temporary AID may be selected from the second AID set. In this case, the first AID set may include AIDs from 0 to 2007, and the second AID set may include AIDs after 2008.

According to the embodiment of the present invention, the AP may assign sequentially increasing temporary AIDs to the random access resource units. When the resource unit pattern is determined, the number of resource units constituting the pattern is determined, and temporary AIDs corresponding to the determined number of resource units are assigned. According to an embodiment, the temporary AID may be sequentially assigned from the second AID set.

Referring to FIG. 15 (b), temporary AIDs increasing one by one from 2008 are assigned to the second to fourth resource units, the sixth resource unit, and the eighth to ninth resource units, which are random access resource units of the primary channel. In other words, 2008, 2009 and 2010 are assigned to the second to fourth resource units, 2011 is assigned to the sixth resource units, and 2012 and 2013 are assigned to the eighth to ninth resource units, respectively. When UL-OFDMA is performed through a plurality of channels, the temporary AID used for the block ACK may be assigned a different value for each channel. Alternatively, the temporary AID may be assigned independently for each channel. In other words, according to an embodiment, 2013 and 2015, which are values after the temporary AID assigned to the primary channel, may be assigned to the first resource unit and the third resource unit, which are the random access resource units of the secondary channel, respectively. According to another embodiment, 2008 and 2009 may be assigned to the temporary AIDs of the first resource unit and the third resource unit of the secondary channel, respectively, independently from the primary channel.

FIG. 15 (c) illustrates another embodiment of the method of representing the user information field of the trigger frame for the channel of FIG. 15 (a). According to the embodiment of FIG. 15 (c), the AID field value of the trigger frame indicating the random access resource unit may be set to the temporary AID value determined as described above.

The AP transmits ACK information to each STA through a block ACK using the temporary AID selected as described above. Meanwhile, the above-described temporary AID selection method is an embodiment of the present invention, and the present invention is not limited thereto. According to another embodiment of the present invention, the temporary AID may be selected from the first AID set as well as the second AID set. That is, unused AIDs which are not assigned to STAs of the corresponding BSS in the first AID set can be selected as temporary AIDs.

If the probe request or the association request is transmitted through the random access resource unit, the AP can further assign a real AID by transmitting a probe response or an association response to the corresponding STA. According to another embodiment of the present invention, when a STA to which the AID is already assigned performs the multi-user uplink transmission using the random access resource unit, the AP may deliver ACK information of the block ACK using the AID assigned to the corresponding STA.

FIG. 16 illustrates a resource allocation method for random access based multi-user uplink transmission according to another embodiment of the present invention. In the embodiment of FIG. 16, duplicative description of parts which are the same as or corresponding to the embodiment of FIG. 15 will be omitted.

First, referring to FIG. 16 (a), the resource unit configuration of the primary channel is the same as that of FIG. 15 (a). However, even in the secondary channel, pattern 1 composed of nine 26-tone resource units is used, and all resource units are set as random access resource units.

The trigger frame and the block ACK used in the multi-user uplink transmission process have a variable length according to the number of allocated STAs. In order to provide an efficient frame transmission and prevent collision with operation of the legacy wireless LAN system, it is desirable to use a frame as short as possible. According to an embodiment of the present invention, a temporary AID indication method for reducing the length of a trigger frame supporting random access may be used.

Referring to FIG. 16 (b), a designated AID is assigned to the first resource unit of the primary channel, and the second through fourth resource units are set as random access resource units. In this case, it is possible to consecutively assign 2008, 2009, and 2010 as temporary AIDs to the second to fourth resource units. In this case, in order to reduce the length of the trigger frame, only the 2010, which is the largest value among the consecutively assigned temporary AID values, may be inserted into the AID field of the trigger frame, and the representation of 2008 and 2009 may be omitted. The STAs receiving the trigger frame can attempt random access on total three resource units by inversely estimating that the two temporary AIDs are omitted when obtaining 2010 as the temporary AID value for the second resource unit. A designated AID is assigned to the fifth resource unit of the primary channel, and the sixth resource unit is set to the random access unit. In this case, since there is no continuous random access resource unit, a temporary AID 2011 is inserted into the AID field of the trigger frame as in the conventional method. It is possible to assign a designated AID to the seventh resource unit of the primary channel and consecutively assign 2012 and 2013 as temporary AIDs to the eighth to ninth resource units. In this case, only 2013, which is the largest value among the consecutively assigned temporary AID values, may be inserted into the AID field of the trigger frame, and the representation of 2012 may be omitted.

When all nine resource units are set as the random access resource units such as the secondary channel of FIG. 16 (b), only the maximum value among the consecutive temporary AIDs may be inserted into the AID field of the trigger frame. If the temporary AID is assigned as a different value for each channel, the maximum value 2022 among the temporary AIDs 2014 to 2022 may be inserted in the AID field of the trigger frame. If the temporary AID is assigned independently for each channel, 2016, which is the maximum value among the temporary AIDs of 2008 to 2016, may be inserted in the AID field of the trigger frame. By inserting the maximum value among the temporary AIDs in the assignable range into the AID field of the trigger frame, the AP can inform the STAs that a total of nine random access resource units have been set.

Figure 17:
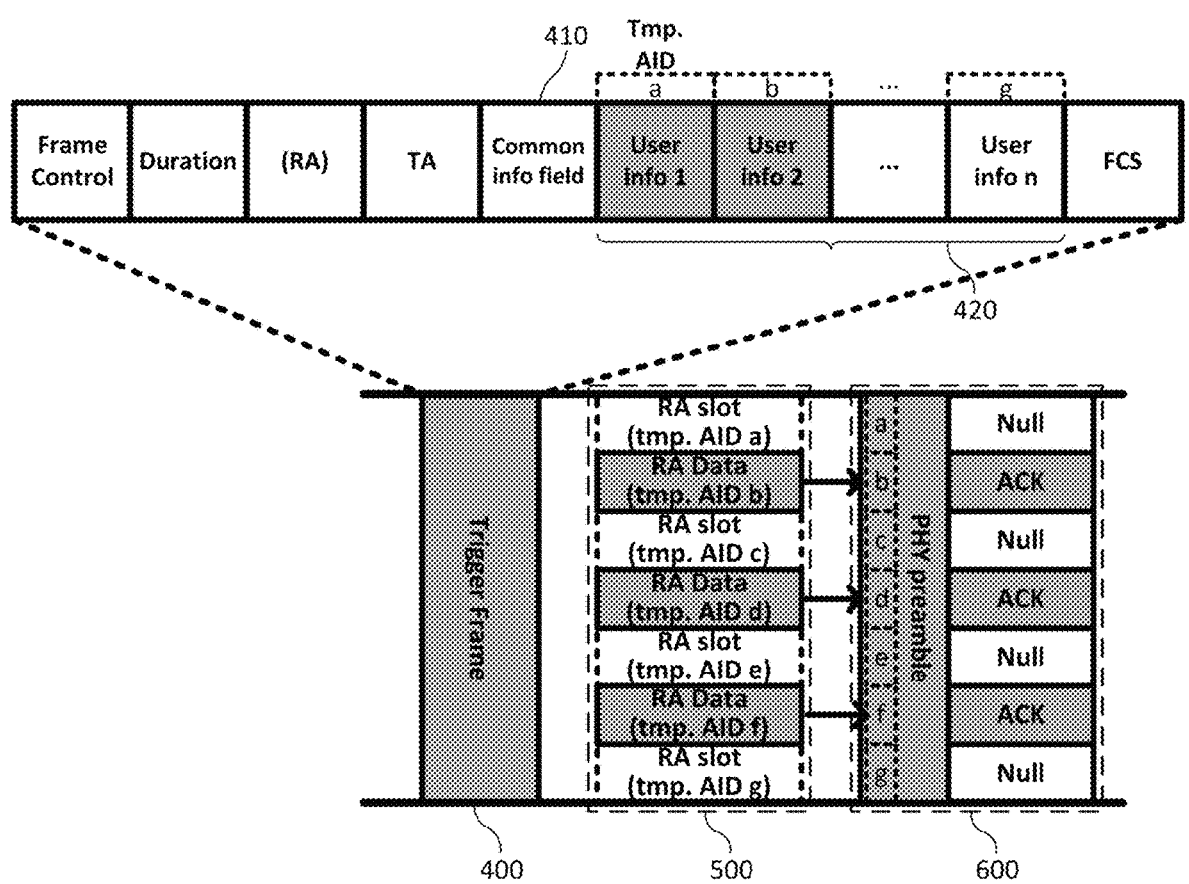
FIGS. 17 and 18 illustrate a method for multi-user uplink transmission using a temporary AID assignment method according to the above-described embodiments.
Figure 18:
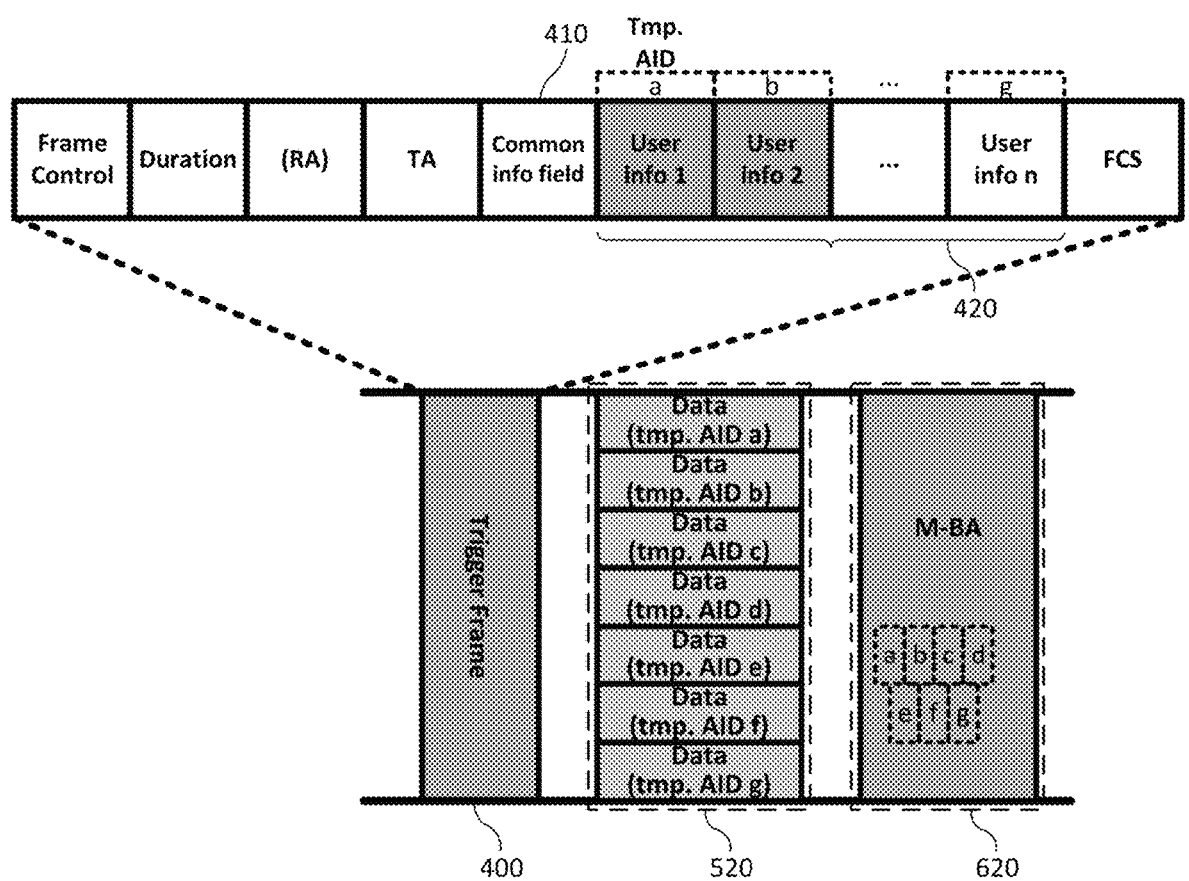

FIGS. 17 and 18 illustrate a method for multi-user uplink transmission using a temporary AID assignment method according to the above-described embodiments. According to the embodiment of FIGS. 17 and 18, the temporary AID may be specified to the STAs via the trigger frame and may be used for identifying ACK information of the block ACK corresponding to the multi-user uplink transmission.

FIG. 17 illustrates an embodiment in which an OFDMA block ACK is transmitted in response to the multi-user uplink transmission. The AP transmits a trigger frame 400 that triggers a multi-user uplink data transmission, and STAs receive the trigger frame 400. As described above, the trigger frame 400 includes a common information field 410 and user information fields 420, and an AID field value of at least one of the user information fields 420 may be set to a temporary AID. The STAs may obtain the temporary AID from the received trigger frame 400.

The STAs receiving the trigger frame 400 transmit multi-user uplink data 500 in response thereto. Each STA selects at least one resource unit among the resource units specified by the trigger frame to transmit the multi-user uplink data 500. In this case, the resource unit on which the multi-user uplink data 500 is transmitted may include a random access resource unit. In addition, the temporary AID of the above-described embodiments may be assigned to at least one resource unit on which the multi-user uplink data 500 is transmitted.

The AP receives the multi-user uplink data 500 transmitted by the STAs and transmits an OFDMA block ACK 600 in response thereto. The STAs that transmitted the multi-user uplink transmission data 500 receive the OFDMA block ACK 600. According to an embodiment of the present invention, a STA may obtain ACK information for the corresponding STA within the OFDMA block ACK 600 based on the temporary AID. According to an embodiment, an HE-SIG-B of the OFDMA block ACK 600 may include temporary AID information assigned to at least one resource unit.

The STAs identify the ACK information in the OFDMA block ACK 600 based on the temporary AID of the resource unit on which the multi-user uplink data 500 transmission is performed. A plurality of STAs may transmit the multi-user uplink data 500 on the same resource unit corresponding to the same temporary AID. Accordingly, the STAs check ACK information of the resource unit corresponding to the temporary AID of the STAs in the OFDMA block ACK 600, and check whether a MAC address of the ACK information matches a MAC address of the corresponding STA. If the MAC address of the ACK information matches the MAC address of the STA, the STA determines that the transmission of the multi-user uplink data 500 is successful. However, if the MAC address of the ACK information does not match the MAC address of the STA, the STA determines that the transmission of the multi-user uplink data 500 has failed.

As described above, according to the embodiment of the present invention, the temporary AID may indicate the resource unit containing ACK information for each STA in the OFDMA block ACK 600. In this case, the temporary AID may be a group AID corresponding to a plurality of STAs performing the transmission of the multi-user uplink data 500.

FIG. 18 illustrates an embodiment in which a multi-STA block ACK (M-BA) is transmitted in response to the multi-user uplink transmission. In the embodiment of FIG. 18, duplicative description of parts which are the same as or corresponding to the embodiment of FIG. 17 will be omitted.

The AP transmits a trigger frame 400 as described above, and the STAs receive the trigger frame 400. The STAs may obtain a temporary AID from the received trigger frame 400. The STAs receiving the trigger frame 400 transmit multi-user uplink data 520 in response thereto. A temporary AID of the above-described embodiment may be assigned to at least one resource unit on which the multi-user uplink data 520 is transmitted.

The AP receives the multi-user uplink data 520 transmitted by the STAs and transmits a corresponding M-BA 620 in response thereto. The STAs that have transmitted the multi-user uplink transmission data 520 receive the M-BA 620. According to an embodiment of the present invention, the STA may obtain ACK information for the STA in the M-BA 620 based on the temporary AID. According to an embodiment, the per-STA information field of the M-BA 620 may include temporary AID information assigned to at least one resource unit.

The STAs identify ACK information in the M-BA 620 based on the temporary AID of the resource unit on which the transmission of the multi-user uplink data 520 is performed. A plurality of STAs may transmit the multi-user uplink data 520 on the same resource unit corresponding to the same temporary AID. Accordingly, the STA checks a per-STA information field corresponding to the temporary AID of the STA in the M-BA 620 and checks whether a MAC address of the per-STA information field matches a MAC address of the corresponding STA. If the MAC address of the per-STA information field matches the MAC address of the STA, the STA determines that the transmission of the multi-user uplink data 520 is successful. However, if the MAC address of the per-STA information field does not match the MAC address of the STA, the STA determines that the transmission of the multi-user uplink data 520 has failed.

Hereinafter, a random access based multi-user uplink transmission method according to another embodiment of the present invention will be described with reference to FIG. 19 to FIG. 21.

In a non-legacy wireless LAN system, STAs attempting UL-OFDMA random access compete to obtain transmission opportunities. The STAs select a random number within a predetermined range as an OFDMA BackOff (OBO) counter, and perform a random access based on the selected OBO counter. STAs decrease their OBO counter by the number of resource units allocated for random access in every time a trigger frame is transmitted. That is, when N resource units are allocated for the random access, the STAs can reduce the OBO counter by a maximum of N in one competition process. STAs whose OBO counter value is smaller than or equal to the number of resource units currently allocated for random access can perform a random access. The STAs arbitrarily select a resource unit allocated for the random access to perform a random access transmission. A STA that has not obtained a random access opportunity in the contention process may attempt a random access by repeating the OBO counter reduction process described above when the next trigger frame is transmitted.

According to the embodiment of the present invention, a control method for preventing excessive collision when a random access based multi-user uplink transmission is performed in a network congestion situation may be used. For example, STAs having an OBO counter value smaller than or equal to the number of resource units currently allocated for random access may perform an additional control process before attempting a random access. Table 1 represents a random access control method according to an embodiment of the present invention.

TABLE 1

| Management | P0 |
|---|---|
| AC_VO | P1 |
| AC_VI | P2 |
| AC_BE | P3 |
| AC_BK | P4 |

Here, P0>P1>P2>P3>P4.

In the Table 1, each item indicates an access category classified based on the priority of data and a corresponding transmission probability. AC_VO indicates a voice access category, AC_VI indicates a video access category, AC_BE indicates a best effort access category, and AC_BK indicates a background access category.

According to the embodiment of the present invention, STAs attempting a random access may perform a differential access by assigning different probability values according to access categories of data to be transmitted. That is, STAs that have acquired the random access transmission opportunity perform the random access transmission with a designated probability according to the access category of the data to be transmitted by the corresponding terminal. The random access transmission probability of the STA having data of an access category with a high probability value becomes higher. When a trigger frame indicating a random access is received, the STAs determine whether to perform a random access based on a probability determined according to an access category of data in a buffer of the corresponding terminal.

According to a further embodiment, the AP may transmit a congestion probability P_c with a value between 0 and 1 via the trigger frame. As the number of terminals in the BSS or the traffic increases, the collision probability of the random access may be increased. The STAs that have received the trigger frame perform the random access transmission based on the multiplication of a probability P determined according to the access category and a congestion probability P_c set by the AP. The congestion probability P_c may be set to a lower value as the traffic in the BSS is higher. The AP can set the P_c value in consideration of the number of collisions in the single-user (SU) and multi-user (MU) transmission up to the present time. In addition, multi-user uplink transmission STAs sharing the same 20

MHz band are required to transmit L-SIG parts in duplicate in the non-legacy wireless LAN system. Accordingly, the AP can estimate how many STAs have attempted to transmit when every random access multi-user uplink transmission is performed. The AP may set the P_c value by using such additional information together.

According to another embodiment, each STA may perform the random access transmission using a transmission probability table indexed by an access category of data and congestion. The AP may transmit congestion index information corresponding to the congestion probability P_c instead of transmitting the congestion probability P_c. The STA may select the transmission probability in the table based on the received congestion index information and the access category information. The congestion information according to the above-described embodiments may be inserted into the common information field of the trigger frame.

Figure 19:
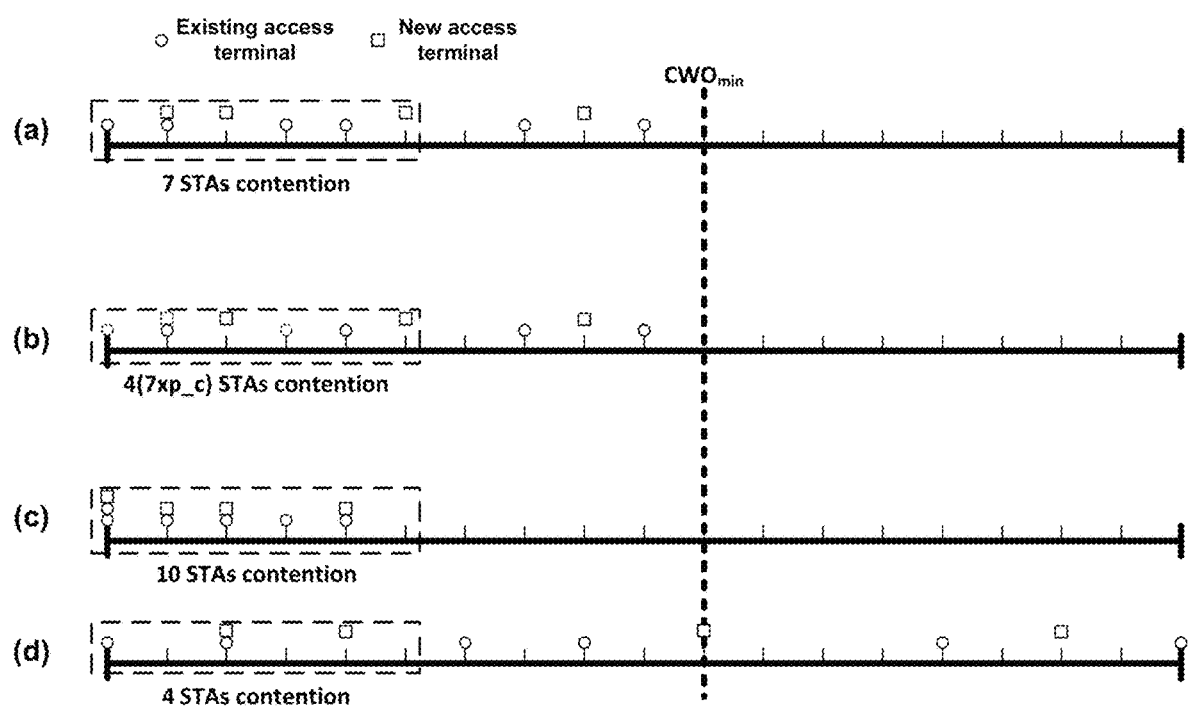
FIG. 19 illustrates a method of controlling a random access based multi-user uplink transmission according to a further embodiment of the present invention.

FIG. 19 illustrates a method of controlling a random access based multi-user uplink transmission according to a further embodiment of the present invention. In FIG. 19, a square box represents an existing access terminal, and a circular box represents a new access terminal. Also, a solid line box indicates a terminal performing random access transmission, and a dotted box indicates a terminal that suspends random access transmission based on the above-described transmission probability. In the embodiment of FIG. 19, it is assumed that the number of random access resource units is set to six.

First, FIG. 19 (a) illustrates a situation in which seven STAs have OBO counters of six or less while six resource units are selected as random access resource units. The seven STAs select random resource units among the six random access resource units to perform random access transmission. Since the number of STAs performing random access transmission is greater than the number of random access resource units, a collision occurs in at least one resource unit.

FIG. 19 (b) illustrates a situation in which STAs perform random access transmission based on the transmission probability of the above-described embodiment. Each STA selects a transmission probability based on at least one of an access category and congestion, and determines whether to perform a random access transmission based on the selected transmission probability. In the example of FIG. 19 (b), three of the seven STAs with OBO counters of less than six have decided to suspend the random access transmission. Therefore, the remaining four STAs perform the random access transmission through the six random access resource units, and the collision probability of the random access transmission is lowered.

FIGS. 19 (c) and 19 (d) illustrate situations in which random access transmission using OBO scaling is performed according to a further embodiment of the present invention. According to an embodiment, the AP may transmit a scaling factor to be used for random access via the trigger frame. The STAs participating in the random access may use a value obtained by multiplying the original OBO counter of the corresponding terminal by the scaling factor as a new OBO counter. The STAs may use the scaled OBO counter as is, or may approximate the nearest integer value to determine the final OBO counter.

The OBO scaling method may reduce or increase the random access attempt rate of STAs. If there are many empty resource units in which the random access transmission has not been performed in the previous multi-user uplink transmission, the AP may decrement the scaling factor to a value of 1 or less, thereby increasing the number of STAs attempting random access in the corresponding multi-user uplink transmission. In contrast, if there are many resource units in which a collision occurred in the previous multi-user uplink transmission, the AP may increase the scaling factor to a value of 1 or more, thereby reducing the number of STAs attempting random access in the corresponding multi-user uplink transmission.

FIG. 19 (c) illustrates a situation where the scaling factor is set to 0.5. Existing access terminals with previously OBO counters of 0, 1, 3, 4, 7 and 9 will have the final OBO counters of 0, 0, 1, 2, 3 and 4 respectively after an adjustment. Also, new access terminals with previously OBO counters of 1, 2, 5 and 8 will have final OBO counters of 0, 1, 2 and 4 respectively after an adjustment. Based on these adjusted OBO counters, a total of 10 STAs with OBO counters of less than six perform the random access transmission.

FIG. 19 (d) illustrates a situation where the scaling factor is set to 2. Existing access terminals with previously OBO counters of 0, 1, 3, 4, 7 and 9 will have the final OBO counters of 0, 2, 6, 8, 14 and 18 respectively after an adjustment. In addition, new access terminals with previously OBO counters of 1, 2, 5 and 8 will have final OBO counters of 2, 4, 10 and 16 respectively after an adjustment. Based on these adjusted OBO counters, a total of four STAs with OBO counters of less than six perform the random access transmission.

According to the embodiment of the present invention, the scaling factor may be calculated on the basis of transmission records up to the previous point, as well as the above-mentioned congestion probability P_c. The scaling factor may be inserted into the common information field of the trigger frame and transmitted to each STA.

Figure 20:
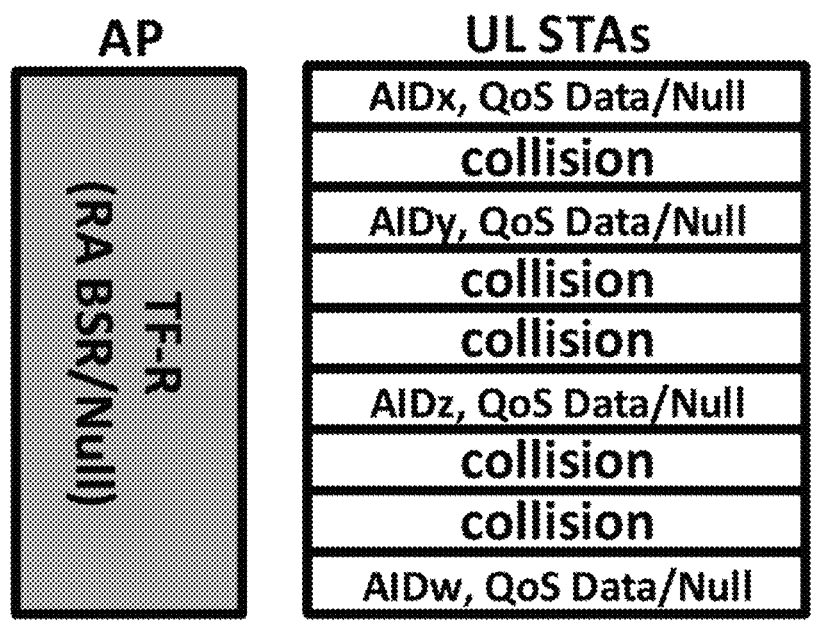
FIG. 20 illustrates a buffer status reporting method using a random access based multi-user uplink transmission according to an embodiment of the present invention.

FIG. 20 illustrates a buffer status reporting method using a random access based multi-user uplink transmission according to an embodiment of the present invention.

In order to select multi-user uplink transmission STAs, the AP should identify buffer status information of the STAs in advance. In the non-legacy wireless LAN system, the AP may designate STAs through the trigger frame to induce to transmit buffer status report. In addition, even if the STA is not induced by the trigger frame, the STA having an uplink opportunity to the AP may transmit the buffer status report together with uplink data. The buffer status information is inserted into a QoS control field of the MAC header to be transmitted to the AP. However, STAs that are neither designated by the AP nor have uplink transmission opportunity to the AP cannot transmit buffer status information.

According to an embodiment of the present invention, a plurality of STAs may perform buffer status report transmission using random access based multi-user uplink transmission. Since the trigger frame for the random access buffer status report targets a plurality of unspecified STAs, an AID field of the user information field of the trigger frame may be set to a predefined AID value. The predefined AID may be an AID designated for the random access buffer status report. Alternatively, an AID indicating a random access based multi-user uplink transmission may be used as the predefined AID.

If the trigger frame only triggers the random access buffer status report, the duration field is set based on the length of the QoS data/null frame according to a specific modulation and coding scheme (MCS). Since the AP may not know the channel conditions of the STAs transmitting the random access buffer status report in advance, the MCS of the trigger frame may be set to the lowest MCS or may be set to the MCS predefined for the random access buffer status report. The buffer status reports transmitted by a plurality of STAs may have the same data size, and a resource unit pattern for a random access buffer status report may be composed of resource units of the smallest unit.

STAs receiving the trigger frame may identify the trigger of the random access buffer status report based on the predefined AID or the duration field value. STAs having uplink data transmit a buffer status report through any resource unit. The buffer status report may be transmitted in QoS data/null format. According to a further embodiment of the present invention, a 1-bit identifier for the random access buffer status report may be inserted in the common information field of the trigger frame for identification of the trigger frame for the random access buffer status report.

Figure 21:
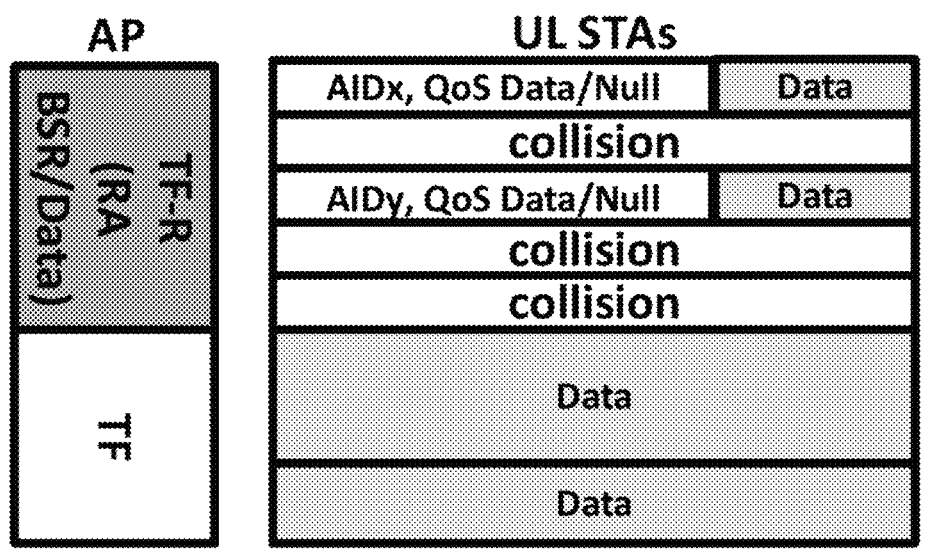
FIG. 21 illustrates a buffer status reporting method using a random access based multi-user uplink transmission according to another embodiment of the present invention.

FIG. 21 illustrates a buffer status reporting method using a random access based multi-user uplink transmission according to another embodiment of the present invention. According to the embodiment of FIG. 21, the buffer status report may be transmitted together with the uplink data.

The AP may configure the entire channel as resource units for reporting the random access buffer status or may form a channel by mixing resource units for the random access buffer status report and resource units for uplink data transmission. When the random access buffer status report is transmitted together with the uplink data, the transmission duration may vary depending on the MCS and the data size of the uplink data. Therefore, the duration field of the trigger frame may be set based on the longest uplink data transmission length.

The STAs transmitting the random access buffer status report selectively transmit uplink data in the buffer based on the duration field information of the trigger frame. In this case, the STA may transmit uplink data of the buffer by fragmenting the data based on the duration field information of the trigger frame. If a random access buffer status report is triggered with uplink data, a predefined AID may be used to identify it or an additional 1-bit identifier may be inserted into every user information field.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
   a transceiver; and
   a processor,
   wherein the processor is configured to:
   receive, through the transceiver, a trigger frame from a base wireless communication terminal with which the terminal is not associated, wherein the trigger frame triggers a multi-user uplink transmission,
   perform an uplink transmission in response to the trigger frame when the trigger frame allocates one or more random access resource units indicated by a temporary association identifier (AID), wherein the uplink transmission is performed through at least one of the random access resource units indicated by the temporary AID, and
   receive, through the transceiver, an ACK frame for the uplink transmission,
   wherein ACK information for the terminal is identified from the ACK frame based on the temporary AID, and
   wherein the temporary AID is an AID not included in a set of AIDs for AID assignment of each terminal in a basic service set (BSS) and has a value different from any AID included in the set of AIDs for AID assignment.

2. The wireless communication terminal of claim 1, wherein the temporary AID indicates one or more random access resource units for uplink orthogonal frequency division multiple access (UL-OFDMA) based random access.

3. The wireless communication terminal of claim 2, wherein the temporary AID indicates the one or more random access resource units for unassociated stations (STAs).

4. The wireless communication terminal of claim 2, wherein the processor uses an OFDMA backoff (OBO) counter for performing the UL-OFDMA based random access.

5. The wireless communication terminal of claim 4, wherein the processor decrements the OBO counter based on the number of random access resource units indicated by the temporary AID.

6. The wireless communication terminal of claim 1, wherein the processor is further configured to:
check an information field corresponding to the temporary AID in the ACK frame, and
determine whether the uplink transmission is successful based on whether a MAC address of the information field matches a MAC address of the terminal.

7. The wireless communication terminal of claim 1,
wherein the ACK frame is a multi-STA block ACK (M-BA) frame, and
wherein the temporary AID is included in an information field of the M-BA frame.

8. The wireless communication terminal of claim 1,
wherein the ACK frame is an OFDMA block ACK frame, and
wherein the temporary AID is included in high efficiency signal B (HE-SIG-BI field of the OFDMA block ACK frame.

9. A wireless communication method of a wireless communication terminal, the method comprising:
receiving a trigger frame from a base wireless communication terminal with which the terminal is not associated, wherein the trigger frame triggers a multi-user uplink transmission;
performing an uplink transmission in response to the trigger frame when the trigger frame allocates one or more random access resource units indicated by a temporary association identifier (AID), wherein the uplink transmission is performed through at least one of the random access resource units indicated by the temporary AID; and
receiving an ACK frame for the uplink transmission,
wherein ACK information for the terminal is identified from the ACK frame based on the temporary AID, and
wherein the temporary AID is an AID not included in a set of AIDs for AID assignment of each terminal in a basic service set (BSS) and has a value different from any AID included in the set of AIDs for AID assignment.

10. The wireless communication method of claim 9, wherein the temporary AID indicates one or more random access resource units for uplink orthogonal frequency division multiple access (UL-OFDMA) based random access.

11. The wireless communication method of claim 10, wherein the temporary AID indicates the one or more random access resource units for unassociated stations (STAs).

12. The wireless communication method of claim 11, wherein an OFDMA backoff (OBO) counter is used for performing the UL-OFDMA based random access.

13. The wireless communication method of claim 12, wherein the OBO counter is decremented based on the number of random access resource units indicated by the temporary AID.

14. The wireless communication method of claim 9, the method further comprising:
checking an information field corresponding to the temporary AID in the ACK frame; and
determining whether the uplink transmission is successful based on whether a MAC address of the information field matches a MAC address of the terminal.

15. The wireless communication method of claim 9,
wherein the ACK frame is a multi-STA block ACK (M-BA) frame, and
wherein the temporary AID is included in an information field of the M-BA frame.

16. The wireless communication method of claim 9,
wherein the ACK frame is an OFDMA block ACK frame, and
wherein the temporary AID is included in high efficiency signal B (HE-SIG-BI field of the OFDMA block ACK frame.

* * * * *